(12) United States Patent
Forth et al.

(10) Patent No.: US 8,298,330 B2
(45) Date of Patent: Oct. 30, 2012

(54) VEGETABLE OIL BASED CONSTRUCTION MATERIALS

(75) Inventors: John Paul Forth, Leeds (GB); Salah Zoorob, Southampton (GB)

(73) Assignee: University of Leeds, Leeds (GB)

( * ) Notice: Subject to any disclaimer, the term of this patent is extended or adjusted under 35 U.S.C. 154(b) by 504 days.

(21) Appl. No.: 12/079,305

(22) Filed: Mar. 26, 2008

(65) Prior Publication Data

US 2008/0245269 A1 Oct. 9, 2008

Related U.S. Application Data

(60) Provisional application No. 60/920,042, filed on Mar. 26, 2007.

(51) Int. Cl.
*C08L 91/00* (2006.01)
(52) U.S. Cl. .......................................... 106/266
(58) Field of Classification Search ............ 106/266
See application file for complete search history.

(56) References Cited

U.S. PATENT DOCUMENTS

2004/0260057 A1 12/2004 Michel

FOREIGN PATENT DOCUMENTS

| GB | 24419 | 0/1915 |
| GB | 1466236 | 3/1977 |
| WO | 0174948 | 10/2001 |

OTHER PUBLICATIONS

Flex-Ten® Carbon Steel Fibers, D&C Supply Co. (2006), 2 pages.*
Forth et al, "Non-traditional binders for construction materials", IABSE Henderson Cooloquium, (Jul. 2006), 6 pages.*
www.answers.com/topic/sand; American Heritage Dictiononary: "sand", accessed Jan. 22, 2011.*
http://www.cotton247.com/news/cg/?storyid=1615; Cotton 24/7, Proper Selection, Maintainence Extend Cooking Oll Life.*
Heness, Heat and Control, "Maximizing Cooking Oll Life".*
Zoorob, S. E., et al., "Vegeblock: Masonry Units from Recycled Waste and Vegetable Oil," presented at 21st Waste Conference on Mar. 26-27, 2006, published in the conference proceedings in electronic format, 10 pages.
"Sundance Renewables," http://www.sundancerenewables.org.uk/biodp/uvo.htm (2002) last updated Apr. 2006—accessed Oct. 24, 2005, 2 pages.
British Standards Institution, "Code of Practice for Use of Masonry—Part 3: Materials and Components, Design and Workmanship," BS5628, Part 3 (1985) 116 pages.
British Standards Institution, "Code of Practice for Use of Masonry—Part 3: Materials and Components, Design and Workmanship," BS5628-3 (2005) 136 pages.
British Standards Institution, "Specifications for clay bricks," BS3921 (1985) 30 pages.
British Standards Institution, "Testing concrete. Part 122: Method for Determination of Water Absorption," BS1881-122 (1981) 10 pages.
British Standards Institution, "Testing conrete. Part 116: Method for Determination of Compressive Strength of Concrete Cubes," BS 1881-116 (1981) 10 pages).
Calais, P. et al., "Waste vegetable oil as a diesel replacement fuel," http://www.shortcircuit.com.au/warfa/paper/paper.htm (created 2004) 9 pages.
Department for Environment Food and Rural Affairs, "Changes to the law concerning the use of waste cooking oil from catering premises," http://www.defra.gov.uk/animalh/by-prods/pdf/uco-leaflet251104.pdf (2004) 2 pages.
Guillen et al., "Study by means of 1H nuclear magnetic resonance of the oxidation process undergone by edible oils of different natures submitted to microwave action," Food Chem. (2006) 96:665-674.
Janick, J., "Reding Oils. Vegetable oils, fats, and waxes," Tropical Horticulture, http://www.hort.purdue.edu/newcrop/tropical/lecture_23/oils_RI.html (2002) 11 pages).
Kendall, K., "The adhesion and surface energy of elastic solids," J. Phys. D: Appl. Phys. (1971) 4:1186-1195.
Muik, B. et al., "Direct monitoring of lipid oxidation in edible oils by Fourier transform Raman spectroscopy," Chemistry and Physics of Lipids (2005) 134:173-182.
Roberts, J.J., "Sustainable masonry construction," 5th IMC, London, Oct. 1998, pp. 1-5.
Trimble, B.E., "Environmental aspects of clay brick," 7th North American Masonry Conference, Jun. 2-5, 1996, South Bend, Indiana, pp. 96-104.
United States Environmental Protection Agency, "OSWER Innovations Pilot, Costilla County Biodiesel Waste-to-Energy Demonstration," http://www.epa.gov/oswer/docs/iwg/2004_costilla_county_draft3.pdf (2004) 2 pages).
International Search Report and Written Opinion for Application No. PCT/GB2008/001109 dated Oct. 1, 2008 (19 pages).

* cited by examiner

Primary Examiner — David M Brunsman
(74) Attorney, Agent, or Firm — Michael Best & Friedrich LLP

(57) ABSTRACT

The present invention provides a composition for use in the production of a construction element, said composition comprising a vegetable oil and a graded aggregate having a maximum aggregate particle size of around 15 mm and/or an aggregate porosity of greater than 5%. Construction elements produced using the composition are described. There is further provided a structural element comprising at least partially cured vegetable oil and an aggregate. A method for producing a construction element is provided comprising mixing partially cured vegetable oil with an aggregate and then further curing said vegetable oil within said mixture.

21 Claims, 13 Drawing Sheets
(11 of 13 Drawing Sheet(s) Filed in Color)

VEGETABLE OIL BASED CONSTRUCTION MATERIALS

CROSS REFERENCE TO RELATED APPLICATION

This patent application claims priority to U.S. Provisional Patent Application No. 60/920,042, filed Mar. 26, 2007, the disclosure of which is incorporated by reference herein in its entirety.

SUMMARY OF THE INVENTION

The present invention relates to vegetable oil based construction materials, methods of producing such materials and methods of construction using such materials.

Vegetable oil is fat extracted from plant sources. Although in principle other parts of plants may yield oil, in practice, seeds form the almost exclusive source. Vegetable oils, fats, and waxes serve many uses. About two-thirds are used for foods and one-third for industrial purposes. Several, such as corn, cottonseed, peanut, olive, and soybean oil, are used for cooking oils, margarine, and salad dressings; some are incorporated into many food products and animal feeds. However, equally important are the industrial uses of these and other oils, including coconut and palm oils, but especially linseed oil, castor oil, tung oil, grape seed oil, and tall oil (a by-product of papermaking). The major industrial uses are for paints, coatings, plasticisers (especially for vinyl), polyamide resins for plastics, and surface-active agents (including soaps and detergents), and as components in linoleums and oil-cloths. Other industrial uses are for lubricants, additives, hot-dip tinning of metal products, hydraulic fluids, glycerol, synthetic fibers, lecithin, food coatings, cosmetics, medicinals, printing inks, plastic foams, and fatty acid raw materials.

It is estimated that UK caterers produce between 50-90 million litres of waste cooking oil each year. Restaurants in the US produce about 300 million US gallons (1,000,000 m$^3$) of waste cooking oil annually. Waste edible oils and fats pose significant disposal problems in many parts of the world. In the past much of these waste products have been used in the production of animal feeds. However due to possible links between BSE and this practice, the use of waste edible animal fats for animal feed is not as common as it once was, resulting in disposal problems.

Recovery of waste cooking oil is strongly supported by the Government as it underpins strategies both for reducing dependence on landfill sites for waste disposal and the reduction of fossil fuels for energy. Recovery figures are unclear, however, commonly a major use of waste vegetable oil has been in the production of bio-diesel fuel. Conversion of waste oils and fats to biodiesel fuel has many environmental advantages over petroleum based diesel fuel. However it is not commercially available everywhere and the 'back-yard' production of biodiesel may present serious risks as the process uses methanol, a toxic and flammable liquid, and sodium or potassium hydroxide, both of which are caustic. By-product disposal may present further difficulties and environmental considerations may preclude production in sensitive areas.

It has become increasingly important to conserve energy and natural resources, and to reduce global pollution and wastage. These global drivers have led the construction industry to consider the use of recycled and waste materials as replacements for traditional aggregates in construction materials, in particular cementitious and clay bound materials. This has helped to improve the sustainability of masonry units which are already considered sustainable. However, the amount of replacement is limited due to the interaction of the replacement materials with the cement/clay binders.

International patent application no. PCT/US01/10537 (University of Alaska) describes the preparation of construction blocks, i.e. bricks, and stabilized soils incorporating ungraded sand and cured vegetable oil. The Comparative Example below highlights a problem with the method described in PCT/US01/10537. In PCT/US01/10537, the sand is mixed with the vegetable oil and the mixture is then transferred to a mould to shape the final block. Curing of the vegetable oil is carried out while the oil/aggregate mixture is within the mould which, it turns out, can prevent sufficient oxidation of the oil which leads to non-uniform hardening of the oil and produces blocks which are unstable and not fit for use. Moreover, the method by which compaction effort is specified in PCT/US01/10537 ("a density between 95 lb/cuft and 115 lb/cuft") is an unreliable method of specifying compaction effort. As bulk densities of compacted specimens are normally calculated using the simple technique of water displacement (ratio of mass to volume displaced by water), the accuracy of the results become questionable. Hence it is proposed to specify compaction effort herein in terms of applied compaction stress, which will be a function of the dimensions of the structural element, type and gradation of constituents, vegetable oil content, curing period, curing temperature, and required cured strength.

PCT/US01/10537 further describes the use of vegetable oil as an additive to conventional bitumen mixtures as used, for example, on road surfaces where surface smoothness is not as critical as in other construction materials, such as bricks, and so much more course aggregates, typically having a maximum particle size of up to 30 mm and an air void content of 3 to 5% are used.

Aspects of the present invention are directed to providing solutions to at least some of the problems mentioned above in relation to the use of vegetable oil as a binder in construction materials.

In addition to well-known construction materials, such as bricks, rammed earth is a walling material constructed by compacting layers of earth into a vertical formwork. Compaction is required to achieve an adequate strength for the material, and it also generates a stratified appearance and tactile finish found attractive to many. In using locally available materials and applying minimal processing, the material is considered to have a low embodied energy. It is also readily recyclable, produces minimal waste, and offers good thermal mass that could be used as part of a low energy environmental control strategy. In this way it is considered to be a sustainable building material.

Rammed earth offers other benefits such as good acoustic performance, fire resistance, and hygroscopicity—an ability to moderate humidity in the building. Disadvantages include low tensile strength, high thermal conductivity, poor surface durability and material shrinkage. These effects have to be considered carefully during the design and detailing stages.

Rammed earth walls are commonly 300-600 mm wide and may be likened to masonry walls in their structural behavior. Compressive strength is typically 2-4 N/mm$^2$, and so the design is most suitable for single or two-story construction. The material strength is highly dependent on the level of compaction achieved, and the inclusion of a binder. Traditionally this binder would be clay already present in the chosen soil, however earth may also be stabilized by adding around 6% cement. This is a common type of construction found, for example, in Australia.

Compaction is achieved by hand-held pneumatic rammers. To maximize compaction the earth must be well-graded and have the correct moisture content. Moisture content has a critical effect on compaction and the final wall strength, and hence must be controlled during construction. An important consideration is the chosen construction technique. Formwork systems and methodologies affect both the appearance of the walls and the speed of construction. The works should therefore be carefully planned to ensure raw materials and finished walls are protected from rainfall. Problems associated with current rammed earth construction techniques include: poor tensile and compressive strength (2-4 N/mm$^2$ with no added cement); poor surface durability (e.g. horizontal driving rain); the addition of cement and/or other pozzolanic material (around 6%) is essential for good performance; and the addition of cement can cause shrinkage problems, the greater the quantity added the greater the problem.

Aspects of the present invention are therefore related to providing improved materials and methods for application to rammed earth construction.

Chemically, fats and oils are triacylglycerols (also called triglycerides), i.e. triesters of glycerol with three long-chain carboxylic acids. About 40 different fatty acids occur naturally. The formulae of some of these acids (disregarding isomers) are shown below in Table 1 below.

TABLE 1

Structures of some common fatty acids

| Acid | Elementary Formula | Constitutional Formula |
|---|---|---|
| Lauric | $C_{12}H_{24}O_2$ | $CH_3(CH_2)_{10}COOH$ |
| Myristic | $C_{14}H_{28}O_2$ | $CH_3(CH_2)_{12}COOH$ |
| Palmitic | $C_{16}H_{32}O_2$ | $CH_3(CH_2)_{14}COOH$ |
| Stearic | $C_{18}H_{36}O_2$ | $CH_3(CH_2)_{16}COOH$ |
| Oleic | $C_{18}H_{34}O_2$ | $CH_3(CH_2)_{14}(CH)_2COOH$ |
| Linoleic | $C_{18}H_{32}O_2$ | $CH_3(CH_2)_{12}(CH)_4COOH$ |
| Linolenic | $C_{18}H_{30}O_2$ | $CH_3(CH_2)_{10}(CH)_6COOH$ |

Fats and oils are almost always mixtures of triglycerides in varying proportions as shown in table 2 below.

The most important cause of oil and fat deterioration is the oxidation process which reduces both the shelf life and the nutritional value of these products. During this process, a great number of changes occur in the sample as a consequence of the incorporation of oxygen into the triglyceride structure, and the generation of highly reactive species which causes the breakdown of the acyl group chains (i.e. groups of the form RCO—, where R is an organic group). Volatile and semi-volatile molecules of different natures are produced, as well as reactions between different acyl group chains to give oligomeric (short chain polymer) or polymeric systems.

Oxidation of unsaturated fatty acids is the main reaction responsible for the degradation of lipids. Under mild conditions, molecular oxygen reacts with the double bonds following a free radical mechanism, the so-called auto-oxidation. This process is quite complex and variable in edible oils due to its dependency on oil type and conditions of oxidation.

Under mild oxidation processes of oils of varied composition, (e.g. at 70° C. with aeration), the degradation of the acyl groups generates primary oxidation products, e.g. hydroperoxides. The concentration of these primary oxidation products increases as the oxidation advances, reaching in most oils a maximum value, after which a sharp degradation of these products occurs. This generates secondary oxidation products (most notably oxygenated aldehydes).

At higher temperatures (e.g. 190° C. for 240 minutes), the oil degradation evolves in a very different way. The two most common observations are the absence of significant concentrations of hydroperoxides and the absence of dienic systems. The degradation rate of hydroperoxides was shown under such conditions to be similar to their rate of formation and for this reason they are almost absent in the oil matrix. Thus the hydroperoxides exist only transiently and decompose rapidly into a multitude of volatile and non-volatile products. Alcohols, saturated aldehydes, α,β-unsaturated aldehydes and epoxy compounds have been reported as major secondary oxidation products.

When comparing the performance of different oils, it was observed that for example in virgin olive oil the highest level

TABLE 2

Fatty acid composition of some common oils

| | Saturated | | | | | Mono unsaturated | Poly unsaturated | |
|---|---|---|---|---|---|---|---|---|
| | | | | | | | | Alpha |
| Vegetable Oil | Capric Acid | Lauric Acid | Myristic Acid | Palmitic Acid | Stearic Acid | Oleic Acid | Linoleic Acid (ω6) | Linolenic Acid (ω3) |
| Almond Oil | — | — | — | 7 | 2 | 69 | 17 | — |
| Canola Oil | — | — | — | 4 | 2 | 62 | 22 | 10 |
| Cod Liver Oil | — | — | 8 | 17 | — | 22 | 5 | — |
| Coconut Oil | 6 | 47 | 18 | 9 | 3 | 6 | 2 | — |
| Corn Oil (Maize Oil) | — | — | — | 11 | 2 | 28 | 58 | 1 |
| Cottonseed Oil | — | — | 1 | 22 | 3 | 19 | 54 | 1 |
| Flaxseed Oil | — | — | — | 3 | 7 | 21 | 16 | 53 |
| Olive Oil | — | — | — | 13 | 3 | 71 | 10 | 1 |
| Palm Oil | — | — | 1 | 45 | 4 | 40 | 10 | — |
| Peanut Oil | — | — | — | 11 | 2 | 48 | 32 | — |
| Safflower Oil* | — | — | — | 7 | 2 | 13 | 78 | — |
| Sesame Oil | — | — | — | 9 | 4 | 41 | 45 | — |
| Soybean Oil | — | — | — | 11 | 4 | 24 | 54 | 7 |
| Sunflower Oil* | — | — | — | 7 | 5 | 19 | 68 | 1 |

*Not high-oleic variety. Note percentages may not add to 100% due to rounding and other constituents not listed.

of degradation is undergone by the oleic acyl groups, in corn oil by the linoleic and in linseed by the linolenic acyl groups. Furthermore, thermal oxidation experiments have shown that the rate of generation of aldehydes is higher in linseed than in corn oil, and higher in corn than in olive oil, showing that this last oil has the highest oxidative stability of the three oils studied.

Alkanals and trans-2-alkenals are the main aldehydes generated from virgin olive oil; trans,trans-2,4-alkadienals, trans-2-alkenals and alkanals are the main aldehydes generated from corn and linseed oils. In addition, virgin olive oil produces the smallest amounts of 4-hydroxy-trans-2-alkenals amongst the three oils studied. These facts are very important as a consequence of the different reactivity of the several classes of aldehydes. In summary not only the rate of generation of aldehydes is different in the three oils but also the class of aldehydes generated.

There are therefore many different factors to consider in providing sustainable alternatives to conventional construction materials incorporating vegetable oils. An object of the present invention is to obviate or mitigate one or more of the above problems with current construction materials and method for producing the same.

BRIEF DESCRIPTION OF THE DRAWINGS

The application file contains at least one drawing executed in color. Copies of this patent application publication with color drawings will be provided by the Office upon request and payment of the necessary fee.

DETAILED DESCRIPTION OF THE INVENTION

Figure 1:
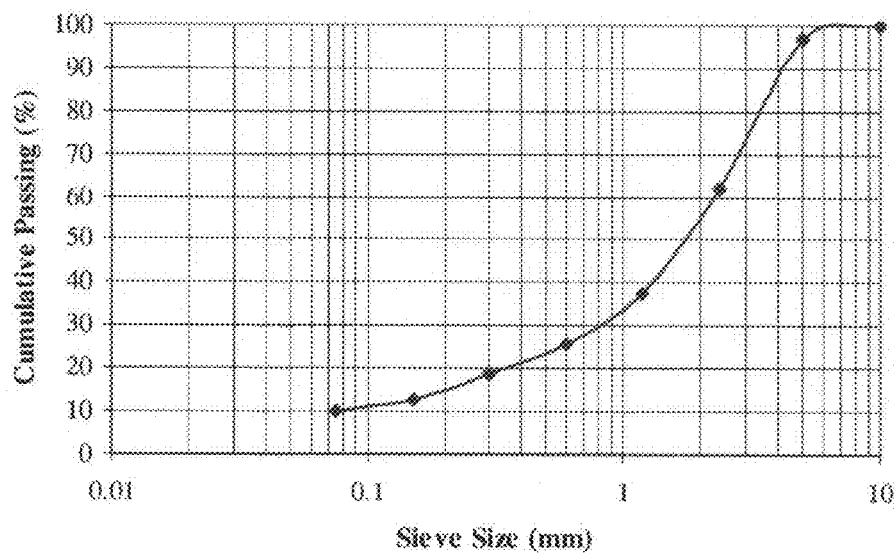
FIG. 1 demonstrates the level of gradation of the limestone aggregate used in Examples 2 and 3.

According to a first aspect of the present invention there is provided a composition for use in the production of a construction element, said composition comprising a vegetable oil and a graded aggregate having a maximum aggregate particle size of around 15 mm.

A second aspect of the present invention provides a composition for use in the production of a construction element, said composition comprising a vegetable oil and a graded aggregate having an aggregate porosity of greater than 5%.

The compositions forming the first and second aspects of the present invention may be used to produce any desirable type of construction element. A further aspect of the present invention related to the above defined first and/or second aspects of the present invention provides a construction element comprising a composition according to the first and/or second aspects of the present invention, wherein said vegetable oil is at least partially cured.

It is preferred that said construction element is a structural element. Moreover, it is preferred that said construction element comprises internal or external reinforcement. Said internal reinforcement preferably comprises or consists of a fibrous reinforcing agent. The term 'fibrous' is used herein to denote an entity which is generally elongate in shape, and is intended to encompass rod-like entities that are solid along their length, or entities which are partly or completely hollow along the full extent of their length so as to define tubular or partly tubular structures. The construction element may contain up to around 100 kg/m³ of the fibrous reinforcing agent, more preferably around 25 to 75 kg/m³ of the fibrous reinforcing agent and most preferably around 50 kg/m³ of the fibrous reinforcing agent. The fibrous reinforcing agent may comprise fibers possessing a cross sectional diameter of up to around 10 mm, more preferably up to around 5 mm, and most preferably around 1 mm. Moreover, the fibrous reinforcing agent may comprise fibers possessing any appropriate length. The length of the fibers may be up to around 200 mm or up to around 100 mm. It is preferred that the fibers are at least about 5 to 10 mm long. It is particularly preferred that the fibers are around 25 to 75 mm long, more preferably around 50 mm long. While any desirable type of fibre may be used, steel fibers have been found to be particularly suitable, for example, NOVOCON HE1050 fibers (Propex Concrete Systems Corp.).

A construction element is considered to be any element which can be used in construction applications and therefore encompasses both structural (i.e. load bearing) elements (e.g. beams, columns, walls, slabs etc) and non-structural (i.e. essentially non-load bearing) elements (e.g. building blocks, masonry units, building stones, bricks and the like. It will be appreciated that non-structural elements, although varying in size, are designed primarily to be small enough to be handled by a single worker, whereas structural elements are generally larger and designed to act as load bearing members, often in combination with at least one further structural element.

Accordingly, it is preferred that compositions according to the first and/or second aspects of the present invention is/are used to manufacture construction elements. It is further preferred that the compositions of the first and/or second aspects of the present invention are used to manufacture structural elements. Examples of structural applications which could employ structural elements manufactured from the composition forming the first and/or second aspect of the present invention include rammed earth construction, hollow section steel column infill, stabilized beams and slabs (flat, ribbed, etc), collar jointed masonry (crumb rubber in-fill) to resist blast loading/act as a retrofitting method for seismic areas etc.

It will be appreciated that due to the size, shape and method of construction of smaller non-load bearing construction elements of the kind described in PCT/US01/10537, such elements will predominantly fail under load in either simple compression or simple flexure (tensile stresses). Hence the design requirements for element such as these are very basic regardless of the end application (typically walls). As long as the elements satisfy a pre-determined compressive or flexural strength level for a certain application (e.g. wall), and as long as they can be bonded with mortar, they are deemed suitable for that application or load level (e.g. height of wall).

The composition of the first and/or second aspects of the present invention are eminently suitable to be used to form cladding panels, up to, for example 2 to 3 meters wide by 30 meters high (off-the-frame cladding).

While the composition of the first two aspects of the present invention can be used to form non-structural element such as individual building blocks/bricks, it is envisaged that the composition is particularly preferred as an alternative to concrete, steel or wood load bearing beams, columns, walls, slabs and the like).

Structural members are not designed to act individually, rather they are built into a structural system whereby many members have to interact directly with each other. For example, in a typical structure when a slab is loaded, the bending & shear stresses are transferred from the slab to the supporting beams which in turn transfer the stresses to the supporting columns which in turn transfer the stresses on to the foundations. In contrast, building blocks of the kind contemplated in PCT/US01/10537 are simply inactive low cost void fillers between the stress dissipating mortar joints.

It will be further appreciated that the behavior of the structural elements (in terms of performance under applied loads and stresses and strains) is very different to that of non-structural elements. For example, compare the complexity of stresses in a long span beam with those of a block under simple compression.

The design requirements of structural elements (i.e. analysis of distribution of bending moments, shear stresses in addition to tensile stresses and compressive stresses) in order to determine the dimensional requirements of the elements are far more sophisticated (and typically require the expertise of a Structural and/or Civil engineer) than those of more simple non-structural elements.

The construction elements formed from the first and/or second aspect of the present invention may be internally or externally reinforced with steel/carbon/glass reinforcing bars, strips or bonded thin plates, fibre reinforced, pre-tensioned, post-tensioned, and the like.

The performance and failure mechanism of such a reinforced element would be entirely different from a non-reinforced element. The performance and failure mechanism of construction elements which incorporate reinforcing elements are based on dimensions, reinforcement type, reinforcement cross sectional contribution to the element, reinforcement details, curing condition, and interconnection with other structural elements in addition to simply its material composition.

In some cases, a structural element may form an integral part of another structural element, e.g. as a substitute to concrete infill in hollow section steel columns in high rise construction.

The graded aggregate of the first aspect of the present invention preferably has an aggregate porosity of greater than 5%.

With regard to the first and/or second aspect of the present invention it is preferred that said graded aggregate has a maximum aggregate particle size of around 13 mm, more preferably around 10 mm.

With regard to the first and/or second aspect of the present invention it is preferred that said graded aggregate has an aggregate porosity of less than around 50%. Preferably the graded aggregate has an aggregate porosity in the range of around 10% to around 40%, more preferably in the range of around 20% to around 30%.

It is preferred that the total vegetable oil content of the composition according to the first and/or second aspects of the present invention is about 1 to about 20 wt %. It is more preferred that the total vegetable oil content of the composition is about 2 to about 15 wt %, more preferably about 3 to about 10 wt %. In a preferred embodiment of the first and/or second aspect of the present invention the total vegetable oil content in the composition is in the range of about 4 to about 5 wt %. It is most preferred that the total vegetable oil content of the composition is about 5 wt %.

It is preferred that the composition according to the first and/or second aspect of the present invention comprises at least one vegetable oil and the or each vegetable oil is separately selected from the group consisting of vegetable oil originating from any plant source, boiled vegetable oil, polymerised vegetable oil, heat treated vegetable oil, fully or partially oxidized vegetable oil, waste vegetable oil and recycled vegetable oil.

Preferably the composition according to the first and/or second aspect of the present invention comprises at least one type of aggregate and the or each aggregate is separately selected from the group consisting of natural soil, quarried crushed mineral aggregates from igneous, metamorphic or sedimentary rocks, including unused and waste aggregates from quarry operations, natural sand, crushed sand, gravel, dredged aggregates, china clay sand, china clay stent, china clay wastes, natural stone, recycled bituminous pavements, recycled concrete pavements, reclaimed road base and sub-base materials, recycled automotive components, such as brake disc linings, crushed concrete, crushed bricks, construction and demolition wastes, waste/recycled flue gas ashes, crushed glass, slate waste, waste plastics, incinerated animal bones, egg shells, sea shells, and by-products from incinerators.

The composition according to the first and/or second aspect of the present invention preferably comprises at least one further component selected from the group consisting of a cementitious binder, a pozzolanic binder, an inert filler, an active filler, a bituminous binder, a natural polymer, a synthetic polymer, and a metal catalyst.

A third aspect of the present invention provides a structural element comprising at least partially cured vegetable oil and an aggregate.

Structural elements which may be provided by way of the third aspect of the present invention include monolithic stress dissipating structures, civil engineering structures, structural monolithic members, and structural members. Examples of possible structural applications include rammed earth construction, hollow section steel column infill, and beams and slabs (flat, ribbed, etc). The current mixing and compaction techniques for producing the rammed earth will remain the same, except for the addition of the vegetable oil(s). As a result it is envisaged that some if not all of the weaknesses listed above in relation to conventional rammed earth construction will be mitigated by the inclusion of the vegetable oil(s).

Preferably the aggregate employed in the third aspect of the present invention is graded. The graded aggregate preferably has a maximum aggregate particles size of around 15 mm, more preferably around 13 mm, and most preferably around 10 mm.

It is preferred that the graded aggregate has an aggregate porosity of greater than 5%. It is further preferred that said graded aggregate has an aggregate porosity of less than around 50%. Preferably the graded aggregate has an aggregate porosity in the range of around 10% to around 40%, more preferably in the range of around 20% to around 30%.

With regard to the structural element according to the third aspect of the present invention it is preferred that said structural element comprises at least one partially cured vegetable oil and the or each partially cured vegetable oil is separately selected from the group consisting of vegetable oil originating from any plant source, boiled vegetable oil, polymerised vegetable oil, heat treated vegetable oil, fully or partially oxidized vegetable oil, waste vegetable oil and recycled vegetable oil.

It is preferred that the structural element comprises at least one type of aggregate and the or each aggregate is separately selected from the group consisting of natural soil, quarried crushed mineral aggregates from igneous, metamorphic or sedimentary rocks, including unused and waste aggregates from quarry operations, natural sand, crushed sand, gravel, dredged aggregates, china clay sand, china clay stent, china clay wastes, natural stone, recycled bituminous pavements, recycled concrete pavements, reclaimed road base and sub-base materials, recycled automotive components, such as brake disc linings, crushed concrete, crushed bricks, construction and demolition wastes, waste/recycled flue gas ashes, crushed glass, slate waste, waste plastics, incinerated animal bones, egg shells, sea shells, and by-products from incinerators.

The structural element according to the third aspect of the present invention preferably comprises at least one further component selected from the group consisting of a cementitious binder, a pozzolanic binder, an inert filler, an active filler, a bituminous binder, a natural polymer, a synthetic polymer, and a metal catalyst.

The structural element preferably comprises internal or external reinforcement. Said internal reinforcement preferably comprises or consists of a fibrous reinforcing agent. The term 'fibrous' is used herein to denote an entity which is generally elongate in shape, and is intended to encompass rod-like entities that are solid along their length, or entities which are partly or completely hollow along the full extent of their length so as to define tubular or partly tubular structures. The construction element may contain up to around 100 kg/m$^3$ of the fibrous reinforcing agent, more preferably around 25 to 75 kg/m$^3$ of the fibrous reinforcing agent and most preferably around 50 kg/m$^3$ of the fibrous reinforcing agent. The fibrous reinforcing agent may comprise fibers possessing a cross sectional diameter of up to around 10 mm, more preferably up to around 5 mm, and most preferably around 1 mm. Moreover, the fibrous reinforcing agent may comprise fibers possessing any appropriate length. The length of the fibers may be up to around 200 mm or up to around 100 mm. It is preferred that the fibers are at least about 5 to 10 mm long. It is particularly preferred that the fibers are around 25 to 75 mm long, more preferably around 50 mm long. While any desirable type of fibre may be used, steel fibers have been found to be particularly suitable, for example, NOVOCON HE1050 fibers (Propex Concrete Systems Corp.).

The construction elements incorporating the composition of the first and/or second aspects of the present invention and the structural elements according to the third aspect of the present invention are produced by mixing the vegetable oil(s) with aggregates which are provided in an amount of up to around 80 to 99%. An amount (preferably a minor amount) of additives may also be added at this stage of the mixing process. Mixing can be achieved using manual, mechanical mixers or high shear mixers with the constituents at ambient or elevated temperatures in an open mixer or in a sealed reaction vessel.

Compaction of the mixture can be achieved by hand-held pneumatic rammers as is the norm for example, for rammed earth construction.

Curing and its effects on the performance of the construction elements have been extensively investigated. The results of these investigations are set out in the Examples which follow. A method of pre-oxidising the oil(s) prior to preparing the loose mix has been developed, which involves bubbling air though the oil(s) to initiate hardening which will subsequently reduce curing times of the mixture and curing temperatures. Pre-oxidation may also be achieved using appropriate microwave radiation. It will be appreciated that the degree of pre-oxidation required to optimise curing but still allow initial mixing of the aggregates and the oil(s) is a critical balancing process.

Depending on the type(s) of vegetable oil used and the final strength of the construction element required, the compacted sections require some form of curing for the oil(s) to polymerise and thus act as a hardened binder imparting strength to the construction element. Curing may be achieved by the application of microwave radiation and/or heat. Heat curing may be achieved following formwork removal via external means by covering the wall unit with a heated jacket/blanket. Heat curing may also be achieved internally whilst the formwork is still on the units by inserting/incorporating heating elements (e.g. heated pipes) into the construction units. It will be appreciated that the heating elements may be suitably arranged to provide reinforcement to the construction element and thereby act as both a heating/curing element and rebar.

A fourth aspect of the present invention provides a method for producing a construction element comprising mixing partially cured vegetable oil with an aggregate and then further curing said vegetable oil within said mixture.

The vegetable oil may be partially cured by any convenient means prior to mixing with the aggregate. In preferred embodiment of the fourth aspect of the present invention the method further comprises partially curing vegetable oil prior to mixing said partially cured vegetable oil with the aggregate. The temperature and duration of heat curing required are dependent at least in part on the type of vegetable oil(s) used. Temperatures ranging from ambient to 250° C., preferably in the range 160 to 200° C. are suitable. Trials have also shown that adequate curing can be achieved by holding the ideal curing temperature for durations up to 4 days, preferably in the range 0.5 to 3 days depending on the mix composition and temperature of curing.

Partial curing of the vegetable oil may be carried out at a temperature in the range of around 100° C. to around 200° C., more preferably around 120° C. to around 180° C. and most preferably at a temperature of around 160° C. Partial curing of the vegetable oil is preferably carried out over a time period of up to around 48 hours, more preferably up to around 24 hours. It is preferred that said partial curing is carried out over a time period of less than or equal to about 12 hours, more preferably less than around 8 hours, and most preferably over a time period of about 2 hours.

In a preferred embodiment the vegetable oil is partially cured by bubbling air though the oil to initiate oxidation and curing in advance of mixing the oil with the aggregate. Curing may be achieved by the application of microwave radiation, with or without additional curing by other means, such as heating.

Said further curing of the partially cured vegetable oil is preferably carried out at a temperature in the range of around 100° C. to around 200° C., more preferably around 120° C. to around 180° C., and most preferably at a temperature of around 160° C. It is preferred that said further curing of the partially cured vegetable oil is carried out over a time period of up to around 48 hours. Preferably said further curing is carried out over a time period of greater than or equal to about 12 hours.

Mixing of the partially cured vegetable oil and the aggregate may carried out at any convenient temperature and it is preferably carried out at around ambient or room temperature, e.g. around 20 to 25° C.

Preferably mixing of the partially cured vegetable oil and the aggregate is carried out over any desirable time period but it is preferred that a time period of up to around 5 minutes, more preferably up to around 2 minutes is employed. It is particularly preferred that mixing is carried out over a time period of around 1 to 2 minutes.

As discussed below in the Examples, the level of compaction of the vegetable oil/aggregate mixture determines many different properties of the final construction element formed. For example, it has been determined that the compressive strength of a cured construction element is directly proportional to the compaction effort applied (stress level) to the loose mixture in the compaction moulds. While any appropriate compaction level can be employed to suit a particular application it has been determined that a particularly preferred range of compaction levels lie in the range of around 1 to around 12 Mpa.

It is preferred that the mixture of the partially cured vegetable oil and the aggregate used in the method forming the fourth aspect of the present invention in total comprises about 1 to about 20 wt % of said vegetable oil. It is more preferred that the total vegetable oil content of the mixture is about 2 to about 15 wt %, more preferably about 3 to about 10 wt %. In a preferred embodiment the total vegetable oil content is in the range of about 4 to about 5 wt %. It is most preferred that the total vegetable oil content of the mixture is about 5 wt %.

The mixture of the partially cured vegetable oil and the aggregate preferably comprises at least one vegetable oil and the or each vegetable oil is separately selected from the group consisting of vegetable oil originating from any plant source, boiled vegetable oil, polymerised vegetable oil, heat treated vegetable oil, fully or partially oxidized vegetable oil, waste vegetable oil and recycled vegetable oil.

It is preferred that the mixture of the partially cured vegetable oil and the aggregate comprises at least one type of aggregate and the or each aggregate is separately selected from the group consisting of natural soil, quarried crushed mineral aggregates from igneous, metamorphic or sedimentary rocks, including unused and waste aggregates from quarry operations, natural sand, crushed sand, gravel, dredged aggregates, china clay sand, china clay stent, china clay wastes, natural stone, recycled bituminous pavements, recycled concrete pavements, reclaimed road base and sub-base materials, recycled automotive components, such as brake disc linings, crushed concrete, crushed bricks, construction and demolition wastes, waste/recycled flue gas ashes, crushed glass, slate waste, waste plastics, incinerated animal bones, egg shells, sea shells, and by-products from incinerators.

Conveniently the mixture of the partially cured vegetable oil and the aggregate may comprise at least one further component selected from the group consisting of a cementitious binder, a pozzolanic binder, an inert filler, an active filler, a bituminous binder, a natural polymer, a synthetic polymer, and a metal catalyst.

A related aspect of the present invention provides a construction element produced according to the method forming the fourth aspect of the present invention. Preferably said construction element is a structural element. It is preferred that said construction element comprises internal or external reinforcement. Said internal reinforcement preferably comprises or consists of a fibrous reinforcing agent. The term 'fibrous' is used herein to denote an entity which is generally elongate in shape, and is intended to encompass rod-like entities that are solid along their length, or entities which are partly or completely hollow along the full extent of their length so as to define tubular or partly tubular structures. The construction element may contain up to around 100 kg/m$^3$ of the fibrous reinforcing agent, more preferably around 25 to 75 kg/m$^3$ of the fibrous reinforcing agent and most preferably around 50 kg/m$^3$ of the fibrous reinforcing agent. The fibrous reinforcing agent may comprise fibers possessing a cross sectional diameter of up to around 10 mm, more preferably up to around 5 mm, and most preferably around 1 mm. Moreover, the fibrous reinforcing agent may comprise fibers possessing any appropriate length. The length of the fibers may be up to around 200 mm or up to around 100 mm. It is preferred that the fibers are at least about 5 to 10 mm long. It is particularly preferred that the fibers are around 25 to 75 mm long, more preferably around 50 mm long. While any desirable type of fibre may be used, steel fibers have been found to be particularly suitable, for example, NOVOCON HE1050 fibers (Propex Concrete Systems Corp.).

A fifth aspect of the present invention provides a composition for use in the production of a reinforced construction element, said composition comprising a vegetable oil, a graded aggregate and a fibrous reinforcing agent.

A related sixth aspect of the present invention provides method for producing a reinforced construction element comprising mixing vegetable oil with a graded aggregate, mixing a fibrous reinforcing agent with said mixture of vegetable oil and aggregate, and then curing said vegetable oil within said mixture of vegetable oil, graded aggregate and fibrous reinforcing agent.

The graded aggregate preferably has a maximum aggregate particle size of around 15 mm or around 10 mm. The graded aggregate may have an aggregate porosity of greater than 5%.

In a preferred embodiment the vegetable oil content of the composition or mixture of vegetable oil and aggregate is about 1 to about 20 wt %, more preferably about 1 to 10 wt % and most preferably around 5 wt %.

The composition or mixture of vegetable oil, graded aggregate and reinforcing agent may contain up to around 100 kg/m$^3$ of the fibrous reinforcing agent, more preferably around 25 to 75 kg/m$^3$ of the fibrous reinforcing agent and most preferably around 50 kg/m$^3$ of the fibrous reinforcing agent. The fibrous reinforcing agent may comprise fibers possessing a cross sectional diameter of up to around 10 mm, more preferably up to around 5 mm, and most preferably around 1 mm. Moreover, the fibrous reinforcing agent may comprise fibers possessing any appropriate length. The length of the fibers may be up to around 200 mm or up to around 100 mm. It is preferred that the fibers are at least about 5 to 10 mm long. It is particularly preferred that the fibers are around 25 to 75 mm long, more preferably around 50 mm long. While any desirable type of fibre may be used, steel fibers have been found to be particularly suitable, for example, NOVOCON HE1050 fibers (Propex Concrete Systems Corp.).

The composition or reinforced construction element preferably comprises at least one vegetable oil and the or each vegetable oil is separately selected from the group consisting of vegetable oil originating from any plant source, boiled vegetable oil, polymerised vegetable oil, heat treated vegetable oil, fully or partially oxidized vegetable oil, waste vegetable oil and recycled vegetable oil.

It is preferred that the composition or reinforced construction element comprises at least one type of aggregate and the or each aggregate is separately selected from the group consisting of natural soil, quarried crushed mineral aggregates from igneous, metamorphic or sedimentary rocks, including unused and waste aggregates from quarry operations, natural sand, crushed sand, gravel, dredged aggregates, china clay sand, china clay stent, china clay wastes, natural stone, recycled bituminous pavements, recycled concrete pavements, reclaimed road base and subbase materials, recycled automotive components, such as brake disc linings, crushed concrete, crushed bricks, construction and demolition wastes, waste/recycled flue gas ashes, crushed glass, slate waste, waste plastics, incinerated animal bones, egg shells, sea shells, and by-products from incinerators.

It is preferred that the composition or reinforced construction element preferably comprises at least one further component selected from the group consisting of a cementitious binder, a pozzolanic binder, an inert filler, an active filler, a bituminous binder, a natural polymer, a synthetic polymer, and a metal catalyst.

A further aspect of the present invention provides a construction element comprising a composition according to the fifth aspect of the present invention, wherein said vegetable oil is at least partially cured. Preferably element is a structural element, which may incorporate external reinforcement and/or additional internal reinforcement.

With regard to the method for producing a reinforced construction element according to the sixth aspect of the present invention, mixing of the fibrous reinforcing agent with the mixed vegetable oil and aggregate may be carried out over a time period of up to around 5 minutes, more preferably around 1 to 3 minutes and most preferably over a time period of around 1 minute.

Curing the vegetable oil in the vegetable oil/graded aggregate/reinforcing agent mixture may be carried out at any suitable temperature, such as a temperature in the range of around 100° C. to around 200° C., more preferably around 120° C. to around 180° C. and most preferably at a temperature of around 160° C. It is preferred that the vegetable oil is cured over a time period of up to around 48 hours, more preferably up to around 24 hours and most preferably over a time period of greater than or equal to about 12 hours.

Preferably mixing of the vegetable oil and the aggregate is carried out at around room temperature. Said mixing may be carried out over a time period of up to around 10 minutes, more preferably up to around 5 minutes.

It is preferred that the mixture of vegetable oil, graded aggregate and fibrous reinforcing agent is subjected to a compaction level in the range of around 1 to around 12 Mpa prior to said curing of the vegetable oil within the mixture, more preferably around 1 to 8 MPa, and most preferably around 4 Mpa prior to said curing of the vegetable oil within the mixture.

In a preferred embodiment of the method forming the sixth aspect of the present invention the method further comprises partially curing said vegetable oil prior to mixing said vegetable oil with the graded aggregate. Said partial curing of the vegetable oil may be carried out at a temperature in the range of around 100° C. to around 200° C., more preferably around 120° C. to around 180° C., and most preferably at a temperature of around 160° C.

The partial curing of the vegetable oil may be carried out over a time period of up to around 48 hours or up to around 24 hours. Preferably said partial curing of the vegetable oil is carried out over a time period of less than or equal to about 12 hours, most preferably a time period of about 2 hours.

The extent of curing throughout the construction element need not be uniform. This is not a problem since the curing regimes forming preferred embodiments of the present invention can be selected to provide adequate stability and performance for the intended application. This non-uniformity in oxidized material depends on the size of the construction element and its porosity, however it is to be noted that the vegetable oil in any block over 35 mm thick which has been cured typically at around 200° C. for 12 to 24 hours will not be completely oxidized. The larger the element the more influence the level of curing will have on its performance. To control this influence the mixture and/or construction element can be designed to include perforations/through voids having desired characteristics.

The relatively large size of typical structural elements (such as load bearing beams) dictates that the elements are preferably cured at least partially in-situ using especially developed curing systems (e.g. in-built curing elements, external heating jackets, etc.). These heating systems in many cases will from part of the structural element, e.g. the internal heating elements in a slab or beam can be in tubular form and can act as reinforcement and/or ducts once the structural element is ready for service. Or in the case of pre-cast elements, specially designed curing systems can be developed to cater for the scale/size of curing.

In conventional methods for producing construction elements involving curing, and those described in PCT/US01/10537, the element is deemed ready for use as soon as the curing regime is complete. However, the present invention provides staged curing such that the construction element gains strength/stiffness as time and curing progress. The design of the structural members may incorporate curing time as an element of design. For example, while a long span reinforced beam is being constructed in stages, parts of the beam may be allowed to cure at a faster rate than others to fit in with the timescale of stress transfer, i.e. when certain parts of the span are to be loaded as opposed to others.

The dimensions and sophistication of the construction elements allow different parts of the elements to be cured to different extents, different rates and at different time scales. For example, using the concept that materials are generally weaker in tension than compression, the underside of a structural beam in accordance with one or more aspects of the present invention (which acts primarily in tension) can be allowed to cure first, thus enabling the beam to sustain some load prior to curing the upper parts (which act primarily in compression). Staged curing of this kind can also assist the transfer of stress between the material of the construction element (i.e. the vegetable oil/aggregate/optional additive mixture) and any reinforcement that is present, which will promote the composite behavior required in this region of the elements at that time. Another example is where imbedded curing elements are incorporated into the construction element design, in which case the core of the element acquires the required strength earlier than the outer parts, i.e. curing from inside out. This of course has to be carefully factored in as part of the design phase, and cannot be allowed to develop in an uncontrolled manner.

In the above defined aspects of the present invention preferred types of vegetable oils that may be used singly or in any desirable combination (for example, mixed or blended together) include vegetable oil originating from any plant source (e.g. rapeseed, palm, linseed, olive, canola, sunflower, soybean, cotton, peanut, maize, coconut, corn), boiled vegetable oil, polymerised vegetable oil, heat treated vegetable oil, and fully or partially oxidized vegetable oil. At least one type of waste vegetable oil (e.g. from cooking) and/or at least one type of recycled vegetable oil may be used either on its own or in combination with any of the above mentioned vegetable oils.

Each of the above mentioned vegetable oils may be used individually or in combination (e.g. blended) with one or more of the following additives. Preferred types of additive that may be used include cementitious binders (e.g. ordinary Portland cement, sulphate resisting cement, high alumina cement, gypsum, cement kiln dust, etc.), pozzolanic binders, (pulverised fuel ash, glass granulated blast furnace slag, silica fume, steel slag, rice husk ash, montmorillonite, kaolinite, illite, etc.), inert fillers (crushed and powdered material from any igneous, metamorphic or sedimentary rocks, carbon blacks), active fillers (lime, hydrated lime, crumb rubber, etc.), bituminous binders (straight run bitumens, oxidized bitumens, hard grade bitumens, bituminous emulsions, cutback bitumens, polymer modified bitumens, foamed bitumens, etc.), natural polymers (plant derived resins, rubber/latex), synthetic polymers (epoxy, rubber, etc.), and/or metal catalysts (metal salts "oxides, hydroxides, sulfates & chlorides" including those of; zinc, nickel, zirconium, aluminium, titanium, copper, iron, calcium, etc.). If used, the amount of catalyst added depends to some extent on the medium used to prepare the catalyst (e.g. an acid) and on the type of oil. It is within the purview of the skilled person to determine the amount of catalyst required.

Blending can be carried out at ambient and/or elevated temperatures, using slow or high shear mixers in open mixers or closed reaction vessels.

The following aggregates may form part of the raw materials mixed with one or more vegetable oil and, optionally, one or more additives, in accordance with the above defined aspects of the present invention. Preferred aggregates include any individual or combination of the following materials: natural soil; quarried crushed mineral aggregates from igneous, metamorphic or sedimentary rocks, including unused and waste aggregates from quarry operations (e.g. fines); natural sand; crushed sand; gravel; dredged aggregates; china clay sand; china clay stent; china clay wastes; natural stone; recycled bituminous pavements; recycled concrete pavements; reclaimed road base and subbase materials; crushed concrete; crushed bricks; construction and demolition wastes; waste/recycled flue gas ashes from, for example, asphalt plants; crushed glass; slate waste; waste plastics; incinerated animal bones; egg shells; sea shells; and waste aggregates as by-products from incinerators (for example incinerator coal fly ash, incinerator coal bottom ash, incinerated sewage sludge, Municipal incinerator bottom and fly ash, steel slag coarse and fine aggregates, blast furnace slag, GGBS, tin slag, copper slag, cement kiln dust, and the like).

Vegetable oils and their derivatives, like all organic matter are biodegradable materials. The construction elements made with vegetable oils are therefore likely to be susceptible to microbial attack. This may not be of fundamental importance when the product is a non-structural element, such as a simple building block, but it would be an issue if the product is a structural member, such as a beam. Hence structural element durability may advantageously include biodegradability at the design stage in addition to in-service performance under load. In some cases, the structural element may require an external protective coating to guarantee durability, which may, for example, be in the form of cementitious rendering, polymeric coating, or the like.

The various aspects of the present invention can be used to produce a highly sustainable product. One of the techniques is to utilise waste/recycled aggregate in addition to using recycled/waste vegetable oil(s). A number of these waste/recycled materials have only relatively recently become available. Furthermore the ever increasing volumes of waste/recycled materials accompanied by mounting environmental pressures make this feature of the present invention highly attractive and beneficial to the environment. Each waste/recycled material type will have different physical and chemical properties (including particle size distribution, crushing strength, fluid absorption, durability, leaching properties, pozzolanic properties, etc) and will require a specific mix design, e.g. compare the properties of demolition crushed concrete to incinerated sewage sludge. In view of the fact that the present invention illustrates that vegetable oil represents a sustainable alternative to traditional clay and cementitious binders used in current masonry units, the present invention can therefore provide a construction element, such as a structural member, composed entirely of waste/recycled constituents.

Examples below present the initial optimisation of a control mix using clean vegetable oil and traditional graded aggregates (waste limestone fine aggregates from a crusher plant). Subsequent optimisation is also performed by replacing the clean oil with filtered waste cooking oil. Selected physical properties of the resultant building unit as produced from the mix are compared with the properties of existing concrete block and clay brick units. The properties evaluated include water absorption and compressive strength. Traditional aggregates may also be replaced with waste aggregates (green glass and the like) and ashes (pulverised fuel ash (PFA), incinerator bottom ash (IBA), incinerated sewage sludge ash (ISSA), and the like.

The invention will be further described by way of example only with reference to the following Comparative Example and non-limiting Examples, in which:

COMPARATIVE EXAMPLE

This trial was carried out in line with Example 1 of International patent application no. PCT/US01/10537. For the construction materials made the density targeted was 1.778-1.826 gr/cm$^3$ (111-114 lb/cuft) and the compressive strength targeted was 9.4-12.6 MPa (1365-1830 psi).

The aggregate material used for the present comparative example was ungraded sand which is commonly used for concrete mixtures with particles size passing 2.36 mm. The vegetable oil used was shop bought soya oil. Properties of materials can be found in Table 3 below.

TABLE 3

Properties of materials used.

| Materials | Specific gravity |
| --- | --- |
| Concrete sand | 2.66 |
| Soya oil | 0.924 |

A total of five experiments were carried out using different compaction pressures and curing regime. In all cases, the oil content was 5% by weight of sand and the curing temperature applied was 230° C. for a time of 12 hours.

The samples prepared in each of the five experiments were evaluated for their density and compressive strength to compare to the results presented in PCT/US01/10537.

Experiments 1 and 2

The mixture of sand and soya oil was compacted at 1 and 2 MPa static compaction for 1 minute. It was found that the samples were not stable, and were easily broken. The samples were cured, without base plates attached, by sitting the sides of the samples on a tray (in a vertical position) however samples were easily broken during routine handling.

Experiments 3 and 4

The mixture of sand and soya oil was again compacted at 1 and 2 MPa static compaction for 1 minute. In Experiments 3 and 4, the base plate of the samples was left attached allowing the samples to be de-moulded and placed safely on a tray. Although these samples were less fragile than those obtained in Experiments 1 and 2, the samples prepared in Experiments 3 and 4 were still easily broken by minor vibrations during routine handling.

Experiment 5

Learning from the problems experienced during Experiments 1 to 4, in order to have denser samples, the compaction level applied was increased to 4 MPa. Two samples were made as described above with each sample being left in its respective mould after compaction for curing. The first sample was tested without its mould base plate attached and the second sample was tested with its mould base plate attached in order to have a flat base.

At 4 MPa compaction, it was felt and observed that there was no significant improvement in the stability of the samples during handling. The properties of the blocks made in Experiment 5, which could be measured are set out below in Table 4.

TABLE 4

Properties of the soya oil-sand blocks made in Experiment 5.

| Sample | Density (gr/cm3) | SG mix | Porosity (%) | Compressive Strength | |
| --- | --- | --- | --- | --- | --- |
| First | — | 2.442 | — | 2.98 Mpa | 432.2 psi |
| Second | — | 2.442 | — | 4.47 MPa | 648.3 psi |

No density data could be obtained since the base of each sample was not properly cured and became damaged when the base plates was removed.

The samples produced and tested in Experiment 5 were dark in colour. This is because of the effect of mould confinement during curing, where the heat from the mould affects the curing process. The upper side of the samples appeared to experience intense heat and the volatilisation only occurred through the surface of the samples. No volatilisation from the base of the samples occurred, illustrated by ineffective curing, hence the base of each sample remained soft.

It is acknowledged that the density and packing (in term of particle size distribution, surface friction, etc.) of the sand will vary depending on the type of sand selected and also compaction pressure used. However, referring to Table 4, even with 4 MPa compaction, the compressive strength of the samples was significantly less than the strengths quoted in PCT/US01/10537. In summary this Comparative Example has confirmed the possibility of using sand with vegetable oil for small construction blocks but neither the densities nor strengths stated in PCT/US01/10537 could be achieved.

Example 1

Learning from the problems experienced during the Comparative Example, two construction blocks were produced using the same sand/soya oil composition as used in the Comparative Example and a compaction level of 4 Mpa, but instead of leaving the blocks within their respective moulds after mixing, the samples were de-moulded with base plates attached and then cured at 230° C. for 12 hours.

In contrast to the samples cured within their respective moulds, in the above Comparative Example, the de-moulded samples were sufficiently strong to be handled for testing without any difficulty.

TABLE 5

Properties of the soya oil-sand blocks made in Example 1.

| Sample | Density (gr/cm3) | SG mix | Porosity (%) | Compressive Strength | |
| --- | --- | --- | --- | --- | --- |
| First | 1.684 | 2.442 | 31.0 | 7.57 MPa | 1098 psi |
| Second | 1.696 | 2.442 | 30.6 | 7.42 MPa | 1076.2 psi |

The samples prepared in Example 1 were lighter than the samples prepared in Experiment 5 of the Comparative Example, since mould confinement was no longer affecting the curing process. The de-moulded samples prepared in Example 1 showed more complete curing than those prepared in Experiment 5, with all parts of the samples from Example 1 hardened. This is because the volatilisation occurred evenly through the sides and the surface of the samples. As would be expected, the base of each sample was darker than other sections of that sample because the plates remained attached during curing.

Referring to Table 5, even though the density and compressive strength of each sample was still less than the ranges quoted in PCT/US01/10537 they were much higher than in the Comparative Example where each sample was cured within its respective mould in accordance with PCT/US01/10537.

Example 2

Materials

Aggregate: Graded Limestone aggregates are commonly used in construction in both concrete and asphalt mixes. The graded limestone aggregate selected for this investigation was supplied in kind by Tarmac Northern Ltd., UK. The material had a nominal maximum aggregate size of 10 mm and was essentially a by-product from a crusher plant. Properties and gradation of this aggregate are shown in Table 6 and FIG. 1.

TABLE 6

Gradation of Limestone aggregate used in Example 2.

| Specific gravity, Oven dried (bulk) | Specific gravity (SSD) | Specific gravity (apparent) | Water absorption (% by mass) |
|---|---|---|---|
| 2.64 | 2.66 | 2.69 | 0.90 |

Vegetable Oil: Clean (random shop bought rapeseed) vegetable oil was used in the manufacture of the initial control mixes (typical density 0.910). Later comparisons were made with mixes incorporating filtered waste cooking oil (typical density 0.928) [1]. The filtered waste cooking oil was supplied in kind by Wastecare, Leeds, UK. This oil was a non-homogeneous mix of oil collected from various establishments, which had been blended together at the Wastecare collection plant. The limestone aggregates and vegetable oil were mixed at room temperature. Following initial trials with various proportions of vegetable oil and a constant aggregate gradation, no problems were encountered with material handling or mix workability. The maximum oil content required for full coating (assessed visually), and which resulted in the lowest mass loss (oil seepage) following sample heat curing, was found to be 5.0%.

Description of the Mixing and Compaction Process

The units were formed using a simple cold mixing process. The vegetable oil was added (between 4.1 to 5.0% by mass of the aggregate) to the aggregate and mixed for approximately 2 minutes. Following the mixing stage, all mixes were compacted in cast iron or steel moulds at predetermined static compaction pressures (range 1-12 MPa). The compacted samples were then de-moulded and cured in an oven at predetermined temperatures (range 120 to 200° C.) and durations (range 12 to 48 hours). Following curing, the samples were allowed to cool down to room temperature prior to further testing.

Specimen Sizes and Compaction Levels

A typical compacted sample produced in this investigation was 40-50 mm high (depending on compaction stress level) with a base dimension of 100×100 mm. All samples were compacted using a 500 kN capacity hydraulic press machine. Compaction pressures of 1, 2, 4, 8 and 12 MPa were applied to various specimens. In the UK, a compaction pressure of 8 MPa is typically applied for conventional block manufacturing. For each specimen, the compaction pressure was increased gradually by 1 N/mm²·s up to the pressure target required and the peak pressure was maintained constant for a period of 1 minute before releasing the load. Testing the strength of the blocks manufactured at various compaction pressures enabled a relationship to be established between compaction effort and compressive strength as the initial part of the mix optimisation process.

Results

Compressive Strength

Figure 2:
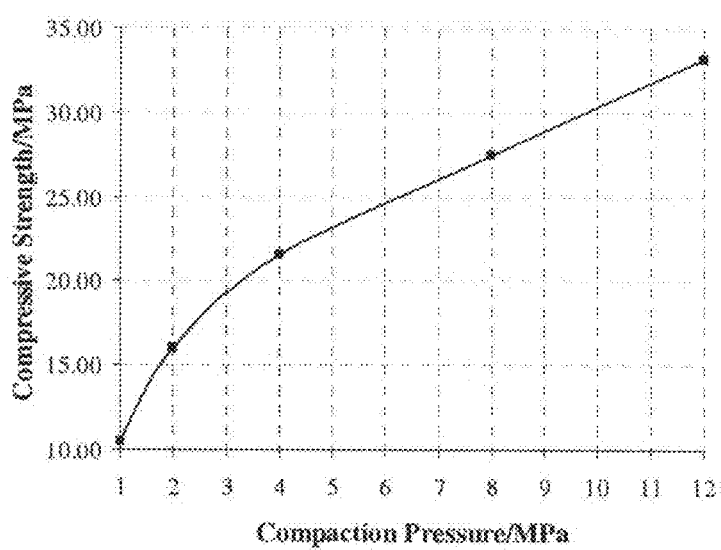
FIG. 2 is a graph showing the dependency of compressive strength on compaction pressure for construction elements investigated in Example 2.

Compressive strength was determined in accordance with BS 1881-116:1983 [2]. Samples were tested dry and the compressive strength achieved was referred to as the dry crushed compressive strength. Samples were loaded on the 100×100 mm faces. From the results it is apparent that the following factors have an important influence on the compressive strength of the samples:

Effect of compaction pressure: Optimisation of the base mixes began with varying compaction pressures ranging from 1-12 MPa. Samples with oil content of 5% by mass of aggregate, were cured for 24 hours at 160° C. Compressive strengths achieved following curing exceeded those of concrete blocks in the UK where typical compressive strengths are in the range of 3.5-7 MPa. The recorded strengths ranged from 14.6 MPa at a compaction pressure of 1 MPa to 36.8 MPa at a compaction pressure of 12 MPa. See Table 7 and FIG. 2.

TABLE 7

Base mixes with varying compaction effort

| Compaction Effort (MPa) | Bulk Density (g/cm³) | Porosity (%) | Initial Rate of Suction kg/(mm²·min) | Water Absorption (%) | Compressive Strength (MPa) |
|---|---|---|---|---|---|
| 1 | 1.602 | 34.08 | 0.024 | 9.554 | 10.51 |
| 2 | 1.800 | 25.94 | 0.020 | 5.103 | 15.98 |
| 4 | 1.916 | 21.16 | 0.033 | 3.567 | 21.58 |
| 8 | 1.965 | 19.15 | 0.026 | 4.001 | 27.44 |
| 12 | 1.938 | 20.26 | 0.028 | 5.048 | 33.12 |

As expected, an increase in the magnitude of the compaction pressure causes the porosity of the resultant block to reduce, which is accompanied by an increase in the degree of aggregate interlock. It is also likely that the binder (i.e. polymerised oil) film thickness reduces with compaction effort. If one assumes that during compressive strength testing the stresses sustained by the binder thin films are primarily in tension, then the effect of reducing the binder film thickness becomes clear from equation 1.

$$P^2 = \frac{2\pi^2 K \gamma a^4}{t} \quad \text{(Equation 1)}$$

where; P=the normal force required to separate a disc of radius 'a' glued to a rigid substrate via an elastic adhesive film of thickness 't'. K is the bulk modulus of the adhesive film and γ is the interfacial surface energy defined as the energy required to separate unit area of the contacting surfaces.

Figure 3:
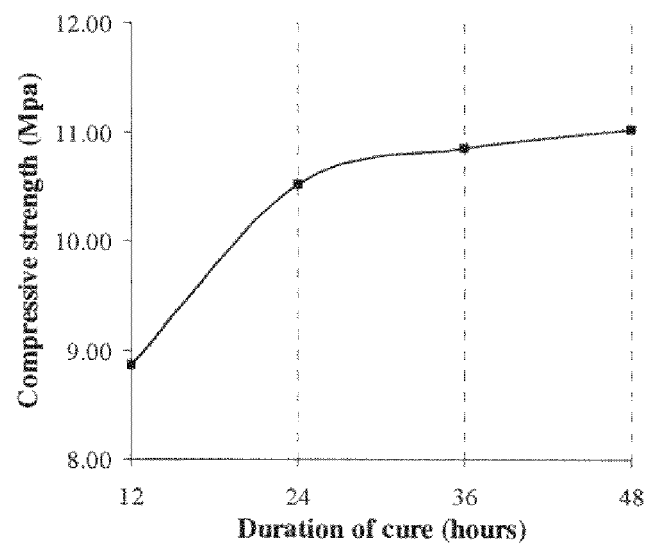
FIG. 3 is a graph showing the dependency of compressive strength on duration of curing for construction elements investigated in Example 2.

Effect of cure duration: This is significant in the manufacturing process as it converts the oil and hence the block into a 'high-strength' material via a complex process of oxidation and polymerisation. The process depends on a number of factors including oxidation time, temperature and the availability of oxygen (hence the importance of block porosity). The duration of curing determines the extent of the oxidation/polymerisation reactions as described above. A temperature of 160° C. and a low compaction pressure of I MPa were chosen based on the optimisation of the compaction pressure. Trials with cure durations of 12-48 hours were then investigated to assess the change in properties of the samples and in particular compressive strength. Compressive strengths recorded ranged from 8.8 MPa at 12 hours curing to 11.0 MPa after 48 hours curing. Samples cured for longer than 24 hours showed no marked improvement in compressive strength. See Table 8 and FIG. 3.

TABLE 8

Base mixes with varying cure duration

| Cure Duration (Hours) | Bulk Density (g/cm$^3$) | Porosity (%) | Initial Rate of Suction kg/(mm$^2$ · min) | Water Absorption (%) | Compressive Strength (MPa) |
|---|---|---|---|---|---|
| 12 | 1.621 | 33.30 | 0.038 | 8.864 | 8.86 |
| 24 | 1.602 | 34.08 | 0.024 | 9.554 | 10.51 |
| 36 | 1.707 | 29.76 | 0.034 | 5.916 | 10.85 |
| 48 | 1.684 | 30.68 | 0.041 | 6.318 | 11.02 |

Figure 4:
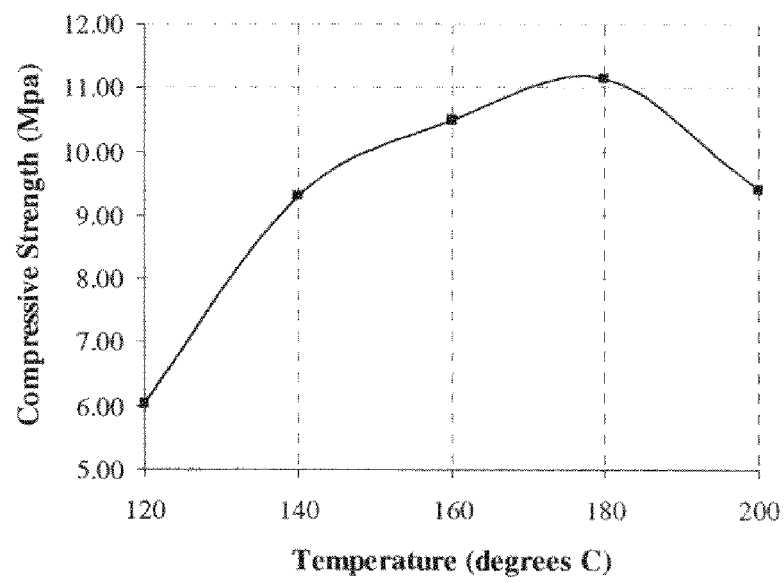
FIG. 4 is a graph showing the dependency of compressive strength on curing temperature for construction elements investigated in Example 2.

Cure temperature: As with all chemical reactions, the temperature and the availability of reactants (limiting reactant in this case being oxygen) during the curing process affects the rate of oxidation and hence the rate at which the vegetable oil solidifies. As the cure temperature can significantly affect the speed of oxidation, it became necessary to establish the optimum temperature at which this took place. Based on previous results samples were compacted at 1 MPa and cured for 24 hours at temperatures in the range 120 to 200° C. Samples cured at 120° C. produced low compressive strength whilst samples cured in the range 140° C. to 200° C. gained much higher strength with little variation between the temperatures. Refer to Table 9 and FIG. 4.

TABLE 9

Base mixes with varying cure temperature

| Cure Temperature (° C.) | Bulk Density (g/cm$^3$) | Porosity (%) | Initial Rate of Suction kg/(mm$^2$ · min) | Water Absorption (%) | Compressive Strength (MPa) |
|---|---|---|---|---|---|
| 120 | 1.623 | 33.23 | 0.082 | 11.360 | 6.03 |
| 140 | 1.560 | 35.81 | 0.010 | 11.582 | 9.31 |
| 160 | 1.602 | 23.07 | 0.024 | 9.554 | 10.51 |
| 180 | 1.728 | 28.89 | 0.022 | 4.809 | 11.15 |
| 200 | 1.651 | 32.09 | 0.058 | 7.869 | 9.40 |

Oil content: To further optimise the mix, four oil content values were investigated by mass of aggregates, namely 4.1, 4.4, 4.7 and 5.0%. The oil content was increased in 0.3% increments in accordance with common etiquette for selecting the optimum bitumen content when designing asphalt mixes. Samples were compacted at 1 MPa and cured for 24 hours at 160° C. An optimum oil content of 5.0% enables the aggregate to acquire a more even coating, with minimal weight loss (seepage) during hot curing resulting in higher compressive strengths. At 5.0% oil content, the uncured samples also had enough cohesion to facilitate more robust handling and less damage during demoulding. Refer to Table 10.

TABLE 10

Base mixes with varying vegetable oil content

| Clean Vegetable Oil (%) | Bulk Density (g/cm$^3$) | Porosity (%) | Initial Rate of Suction kg/(mm$^2$ · min) | Water Absorption (%) | Compressive Strength (MPa) |
|---|---|---|---|---|---|
| 4.1 | 1.659 | 32.745 | 0.013 | 7.597 | 7.50 |
| 4.4 | 1.655 | 32.550 | 0.008 | 7.351 | 9.03 |
| 4.7 | 1.656 | 32.195 | 0.030 | 8.113 | 9.72 |
| 5.0 | 1.602 | 34.080 | 0.024 | 9.554 | 10.51 |

Surface of the Samples

In the green (uncured) state, samples were found to possess poor strength and presented handling problems at lower oil contents and compaction levels. After curing, the samples possessed higher strengths and could thus be more easily handled. Cured samples possessed smooth surfaces when compacted at pressures of 4 MPa and above, however those below 4 MPa tended to have less even surfaces. In general, the blocks have perfect arises, though corners were liable to fragment more easily at low compaction pressures.

Bulk Density and Porosity

Bulk density was measured by water replacement and was found, as expected, to be influenced by the compaction pressure. The bulk densities obtained for the cured samples ranged from 1.560 to 1.965 g/cm$^3$, with a porosity range from 19.15% for the higher densities to 35.81% for the lower densities.

Water Absorption and Initial Rate of Suction

The 24-hour water absorption tests were based on the method described in BS 1881-122:1983 [3]. These ranged from 4% to 11.5% and are equivalent to concrete block and clay brick values. The initial rate of suction (IRS) was measured in accordance with BS 3921:1985 [4]. The maximum value achieved was 0.082 kg/m$^2$/min. IRS values were well within the maximum figure of 1.5 kg/m$^2$/min stated in BS5628 Pt. 3 [5] for clay masonry.

Elastic and Time-Dependent Results

Elastic: The effect of duration of cure on the elastic modulus of the mixes can be seen in Table 11.

TABLE 11

Elastic Modulus

| Cure Duration/Hours | Elastic Modulus/GPa |
|---|---|
| 12 | 2.2 |
| 24 | 4.6 |
| 36 | 7.8 |
| 48 | 2.9 |

Figure 5:
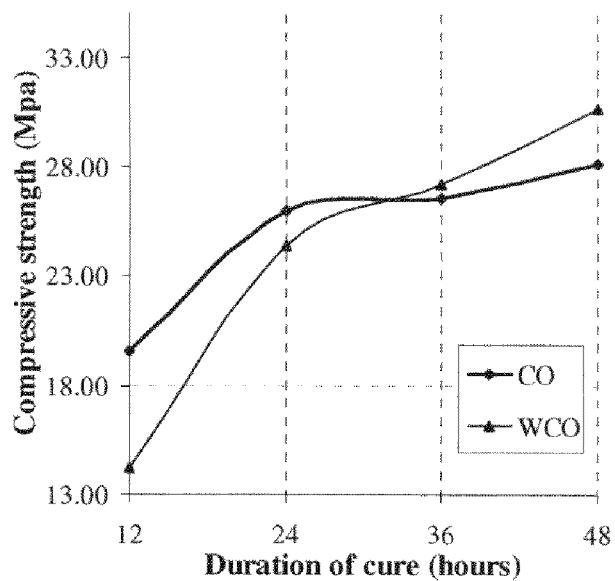
FIG. 5 is a graph comparing the dependency of compressive strength on duration of curing for construction elements incorporating clean/virgin vegetable oil (CO) and waste vegetable oil (WCO)

From 12 to 36 hours there is a clear trend of increasing modulus with duration. This was also the case of compressive strength with duration of cure (FIG. 5). However, the compressive strength continued to increase when the duration of curing was extended to 48 hours. This was not the case with the elastic modulus—the recorded modulus for the 48 hour duration is surprising. Additional indications may be obtained from the results obtained for the moisture movement and creep tests described below.

Moisture Movement Behavior

All unloaded samples remained reasonably stable, exhibiting little shrinkage or expansion; recorded strains were of the order of 60 microstrain. For this investigation a 50 mm Demec gauge was used to record strains.

Static Creep

Figure 6:
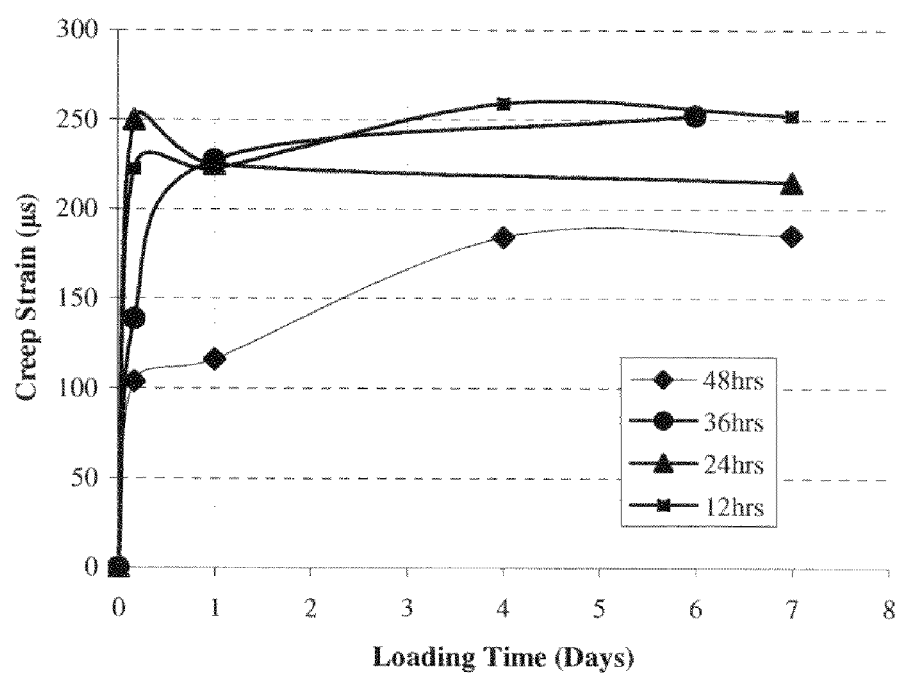
FIG. 6 is a graph illustrating the effect of heat curing on creep performance.

The tests were run using a 'dead load arm' system whereby a constant stress of 1 MPa was applied to the samples. Eight readings were taken for each set of two samples. Strains were read before loading, immediately after loading, 4×30 minutes, 2×60 minutes and once daily thereafter for a period of seven days. Specimens were tested following a range of hot curing durations at 160° C. to detect and quantify any plastic behavior in the binder response. A more likely outcome would be a relationship between creep stiffness (rigidity) and compressive strength. FIG. 6 shows creep values around 250 μs for blocks cured at less than 48 hours and around 200 μs following 48 hour curing. These values of creep are similar to creep of concrete blocks found in the UK. There is a reasonable trend of reduction in creep with increasing cure duration (except for the 36 hour sample).

Test Results Using Replacement Waste Oil

The optimised control mixes were subsequently used as a starting point from which further comparisons were made and the fresh clean virgin cooking oil (CO) was replaced with the filtered waste cooking oil (WCO). Samples containing 5% oil were compacted at 4 MPa and cured at 160° C. for durations of 12-48 hours. Clean vegetable oil produced compressive strengths in the range 19.6 MPa at 12 hours curing to 28.1 MPa at 48 hours, whereas the waste cooking oil ranged from 14.2 MPa at 12 hours to 30.7 MPa at 48 hours.

It was highly encouraging to note that beyond 24 hours curing, the blocks containing WCO seem to possess higher compressive strength values than the CO blocks. (refer to Table 12 and FIG. 5).

TABLE 12

Comparison of the effect of curing duration on properties of blocks using clean vegetable oil and waste cooking oil.

| Type of Oil | Cure Duration (hours) | Bulk Density (g/cm³) | Porosity (%) | Initial Rate of Suction kg/(mm² · min) | Water Absorption (%) | Compressive Strength (MPa) |
| --- | --- | --- | --- | --- | --- | --- |
| CO | 12 | 1.772 | 27.08 | 0.090 | 7.796 | 19.57 |
| CO | 24 | 1.855 | 23.68 | 0.028 | 5.298 | 25.98 |
| CO | 36 | 1.877 | 22.78 | 0.083 | 5.329 | 26.53 |
| CO | 48 | 1.918 | 21.08 | 0.035 | 4.081 | 28.14 |
| WCO | 12 | 1.792 | 26.25 | 0.033 | 7.175 | 14.20 |
| WCO | 24 | 1.832 | 24.62 | 0.033 | 6.012 | 24.37 |
| WCO | 36 | 1.847 | 23.99 | 0.040 | 6.239 | 27.19 |
| WCO | 48 | 1.893 | 22.10 | 0.035 | 5.145 | 30.66 |

The optimisation performed during this investigation has confirmed that cooking oil (both virgin and waste) can be used as a binder in construction units. These results confirm the development of a control mix using traditional graded mineral materials and that this mix has the potential to incorporate various types of recycled and waste materials as replacement for the traditional aggregates. Values of compressive strength obtained for the mixes in this investigation are much higher than those obtained in the Comparative Example and at least equivalent to concrete block masonry units found in the UK and class C clay bricks.

Example 3

Two trials were conducted to produce structural units comprising vegetable oil and a graded aggregate. Samples in the form of beams were produced using a concrete beam mould of size 100×100×500 mm. Compaction of each sample was carried out using a Kango Hammer which was used to compact the samples with the assistance of (body weight) pressure and vibration effect.

The graded limestone aggregate used had a nominal maximum aggregate size of 10 mm (see FIG. 1) and was essentially a by-product from a crusher plant. The binder used was waste vegetable (cooking) oil. The properties of the materials are given in Table 13.

TABLE 13

The properties of the materials.

| Material | Density (gr/cm³) | Water Abs. (%) | Max particle size(mm) |
| --- | --- | --- | --- |
| Limestone dust | 2.7 | 0.9 | 10 |
| Waste vegetable oil | 0.928 | — | — |

First Trial

Two beams were made, each beam having a waste vegetable oil content of 5% by mass of aggregates. One beam had a 16 mm diameter steel ribbed reinforcement bar in the centre of the beam and the other beam had two 16 mm diameter steel ribbed reinforcement bars at the lower side of the beam. Compaction of the mixtures was carried out in three layers using the Kango Hammer. The two samples were not de-moulded immediately after compaction due to their size, instead both beams were cured in an oven at a temperature of 160° C. for 24 hours whilst still contained in their respective moulds.

Figure 7:
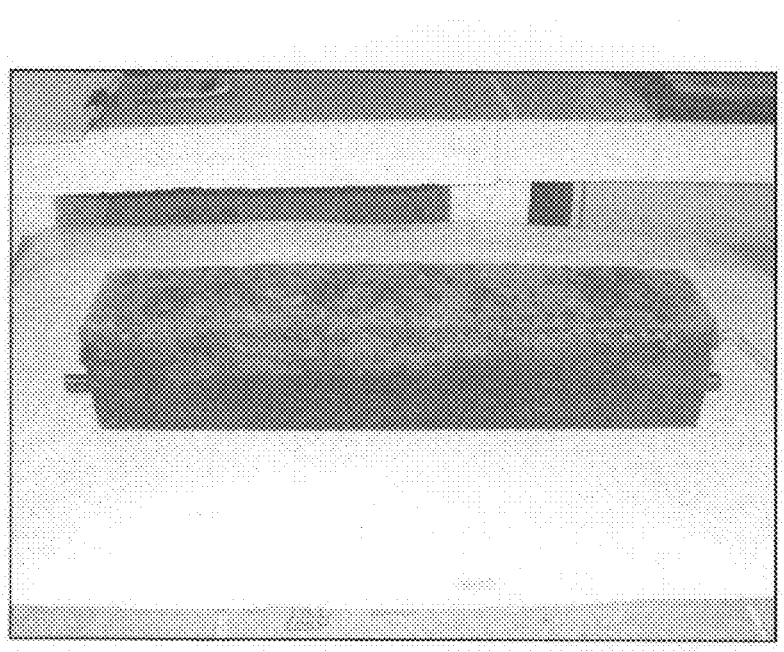
FIG. 7 is a photograph of a structural beam incorporating vegetable oil in accordance with the third aspect of the present invention produced as described in Example 3.

The beam with two reinforcement steel bars was then further cured (whilst within its mould) for 2×24 hours at 160° C., to harden the whole part of the sample. The beam could be de-moulded (see FIG. 7). The de-moulded beam was cured again at 160° C. for 24 hours.

Figure 8:
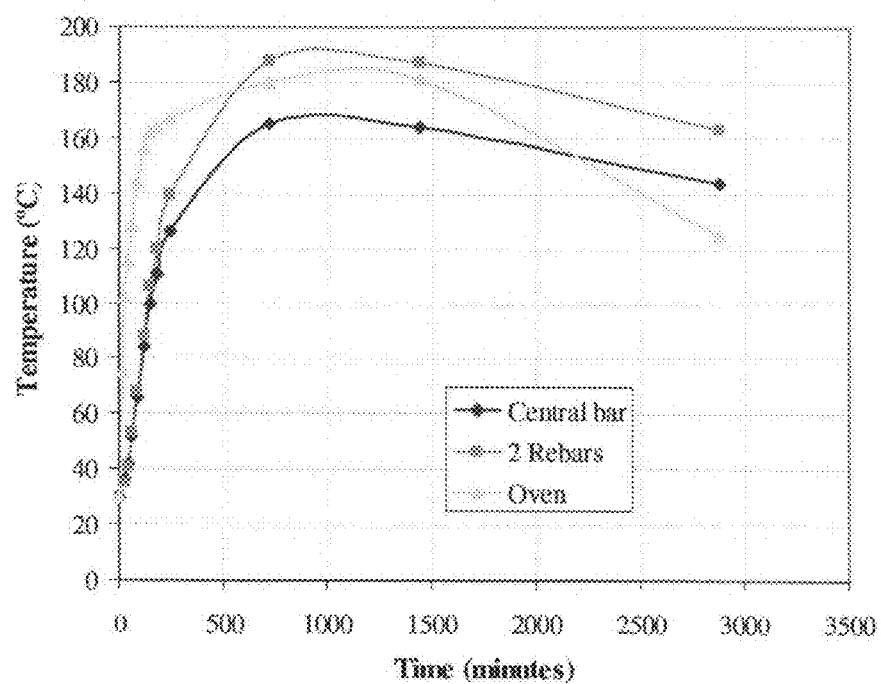
FIG. 8 is a graph showing the variation of the temperature of the oven and steel reinforcing members incorporated into structural elements as described in Example 3.

Thermocouples were attached to the steel reinforcement used (both for the one with a central bar and 2 steel-rebars) to monitor the temperature of the reinforcement (FIG. 8) in relation to the air temperature in the oven, as it was envisaged that this heat may be beneficially utilised to aid curing the beam from the inside out. FIG. 8 shows that the temperatures monitored using thermocouples indicated slight differences between samples, but both followed the same general trend.

Upon inspection of the samples it was apparent that heat had been transmitted through the rebar and aided the curing of the surrounding mix.

Second Trial

Figure 9:
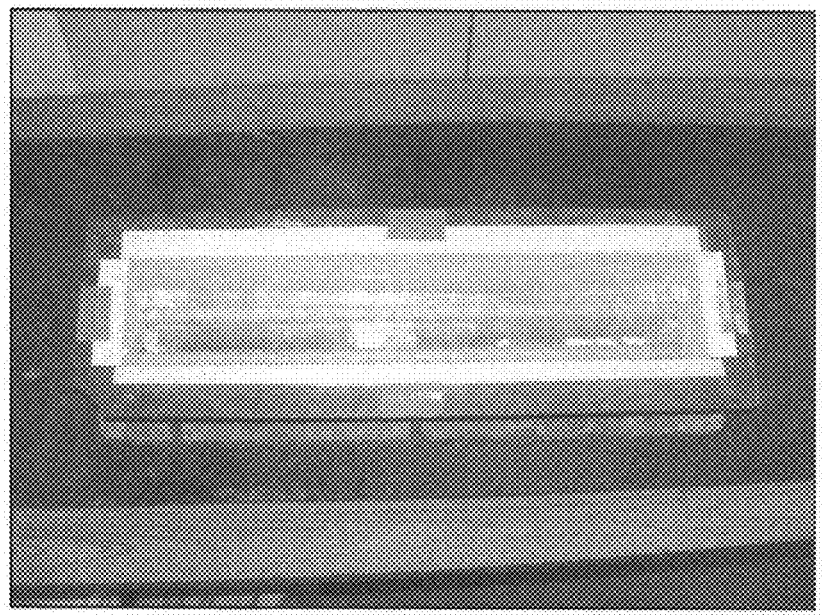
FIG. 9 is a photograph of a mould lined with foil backing paper and plastic sheeting ready for receipt of a vegetable oil/aggregate mix as described in Example 3.

In this trial foil backed paper was laid on the base of the mould, whilst plastic sheets from unused laminated poster paper were laid in the sides as shown in FIG. 9.

Figure 10:
FIG. 10 is a photograph of an arrangement of moulds used as described in Example 3.

The samples were compacted in one layer. This was done by putting another mould on top of the other, as shown in FIG. 10, to enable a sufficient amount of loose mixture to be poured into the mould. The reinforcement used was two glass fibre reinforcement bars of 16 mm diameter.

Figure 11:
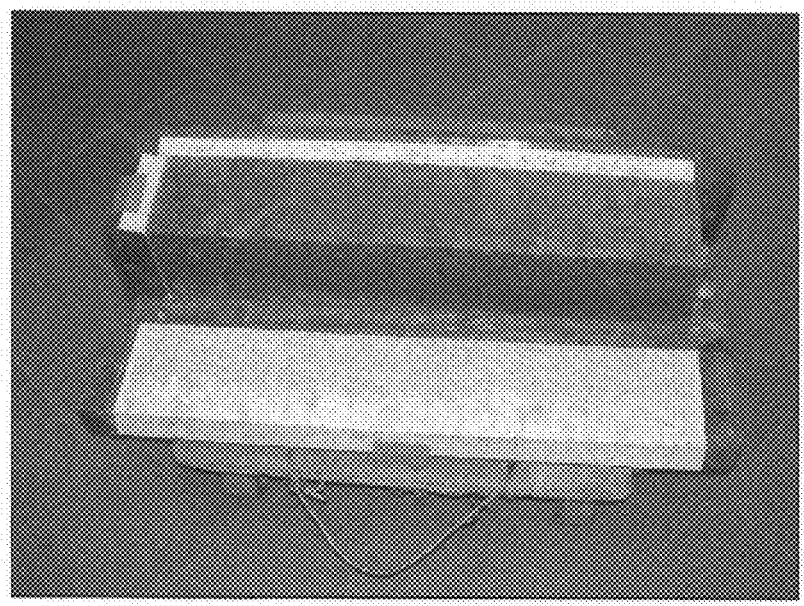
FIG. 11 is a photograph of a compacted sample ready to be de-moulded as described in Example 3.
Figure 12:
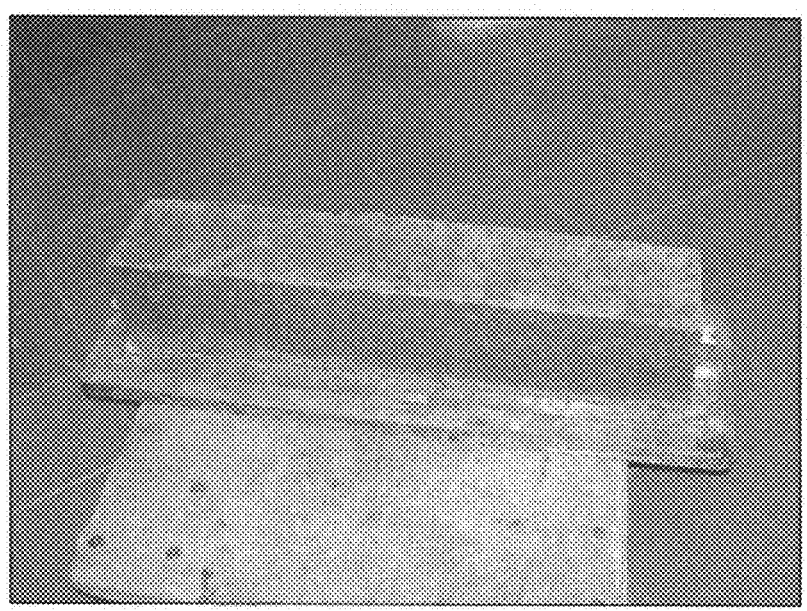
FIG. 12 is a photograph of the sample investigated in Example 3 shown with the base plate of the mould still attached.

The compacted sample could be de-moulded easily (see FIG. 11). The base of the sample was left attached during the first 24 hour curing at 160° C. (FIG. 12).

After 24 hours curing, the base of the sample was removed with no difficulties; the sample was then cured for a further 24 hours at the same temperature.

Figure 13:
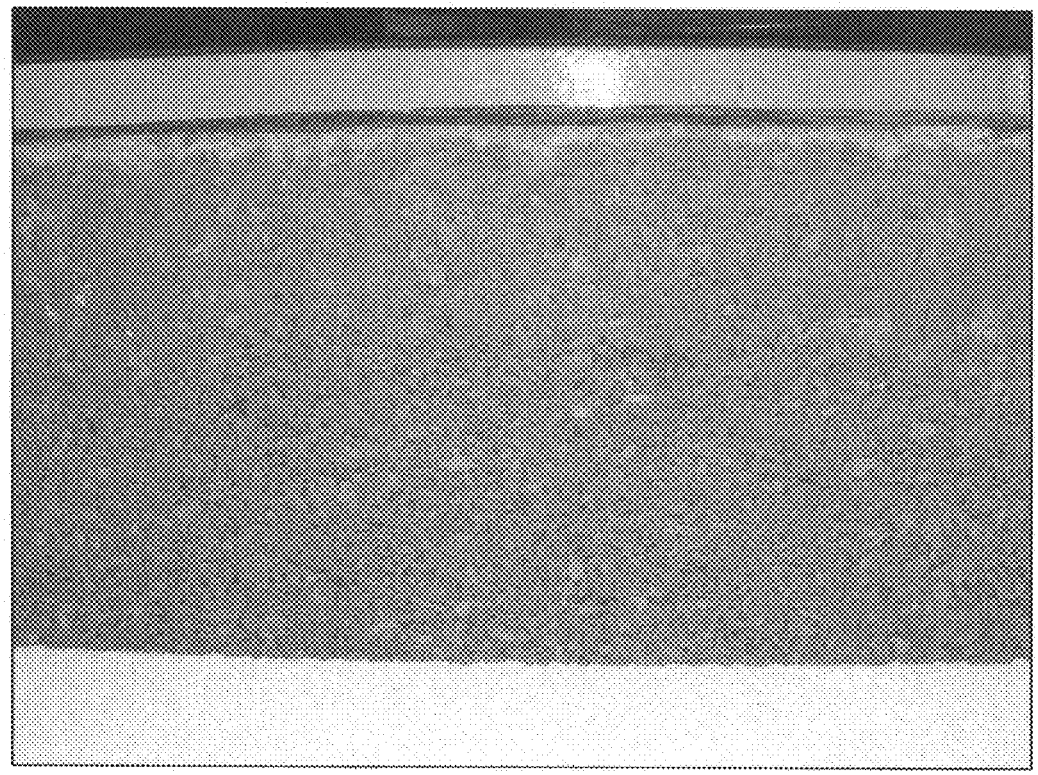
FIG. 13 is a close-up photograph of a side of a structural element formed as described in Example 3.

As the sample was compacted in one layer, it clearly could be seen that the density on the upper side was denser then the lower side of the sample, as shown in FIG. 13. No cracks were visible.

Figure 14:
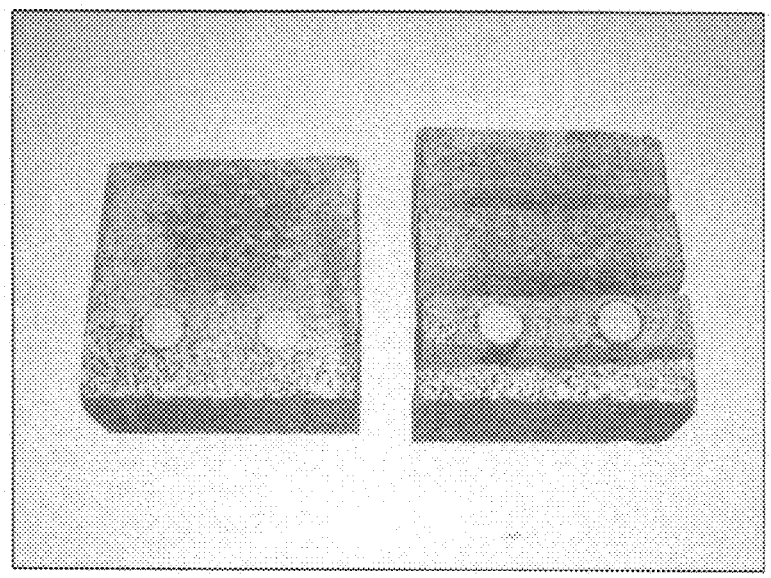
FIG. 14 is a photograph of the sample shown in FIGS. 11 to 13 cut in to sections for inspection and further testing as described in Example 3.

The cured beams from the first (steel rebar) and second trials were first tested for their flexural strength. After the flexural testing, the sample from the second trial was cut into sections (FIG. 14). Three parts of the cut sample (upper, middle and lower part) were tested for their density. The section that contains reinforcement was not tested.

The sample from the second trial was broken and observed for it curing effectiveness, which can be significantly affected by the porosity of the sample. The lower part of the sample underwent more effective curing due to its lower density (higher porosity) and the flexural strength of the sample from the first trial was a lot stronger than the sample from the second trial as shown in Table 14.

TABLE 14

Properties of the vegetable oil-containing beam

| | | First trial | Second trial |
|---|---|---|---|
| Upper side | Flexural strength | 26.4 kN | 6.1 kN |
| | Deflection at failure | Not available | 1.95 mm |
| | Density | Not available | 2.355 gr/cm$^3$ |
| | Porosity | | 3.25% |
| Middle side | Density | Not available | 2.300 gr/cm$^3$ |
| | Porosity | | 5.51% |
| Lower side/base | Density | Not available | 2.109 gr/cm$^3$ |
| | Porosity | | 13.35% |
| Average | Density | Not available | 2.255 gr/cm$^3$ |
| | Porosity | | 7.35% |

Example 4

The following example describes an investigation in to the effect of partially pre-curing the vegetable binders used in vegetable oil based construction materials according to the present invention.

Clean vegetable oil (Rapeseed vegetable oil) was used as the virgin oil. The virgin oil was heated in a sealed deep fryer and at the same time, air was bubbled through the oil to pre-oxidise, and thereby part cure, the oil.

Batches of virgin oil, one litre at a time, were subjected to the above pre-oxidation process. The oil samples were maintained at a temperature of 160° C.±5° C. during exposure to the air. Air was continuously supplied into the oil with a constant flow of 15 litres per minute. This air flow ensured that an even system of bubbles was created throughout the oil layer. Several oil samples were prepared using different durations of heating and exposure to air: 0.25; 1; 2; 3; 4; 6; and 12 hours.

The pre-oxidized oil samples were tested for their viscosity and density and then compared with the virgin (non-pre-oxidized) oil and a selected waste oil. The oils were then used as binders to bind a waste limestone aggregate to make vegetable oil based construction element samples.

Viscosity and Density Tests for Different Vegetable Oils

The viscosity and density tests were carried out by using the Anton Paar Viscometer (Stabinger Viscometer SVM 300/G2). Seven pre-oxidized oil samples, the virgin oil and the selected waste oil were tested. The temperature of the samples was controlled at 20±0.001° C.

The test was repeated three times for each sample. Average results for the viscosity (dynamic and kinematic viscosities) and density of the sample oils are shown in FIG. 15.

Figure 15:
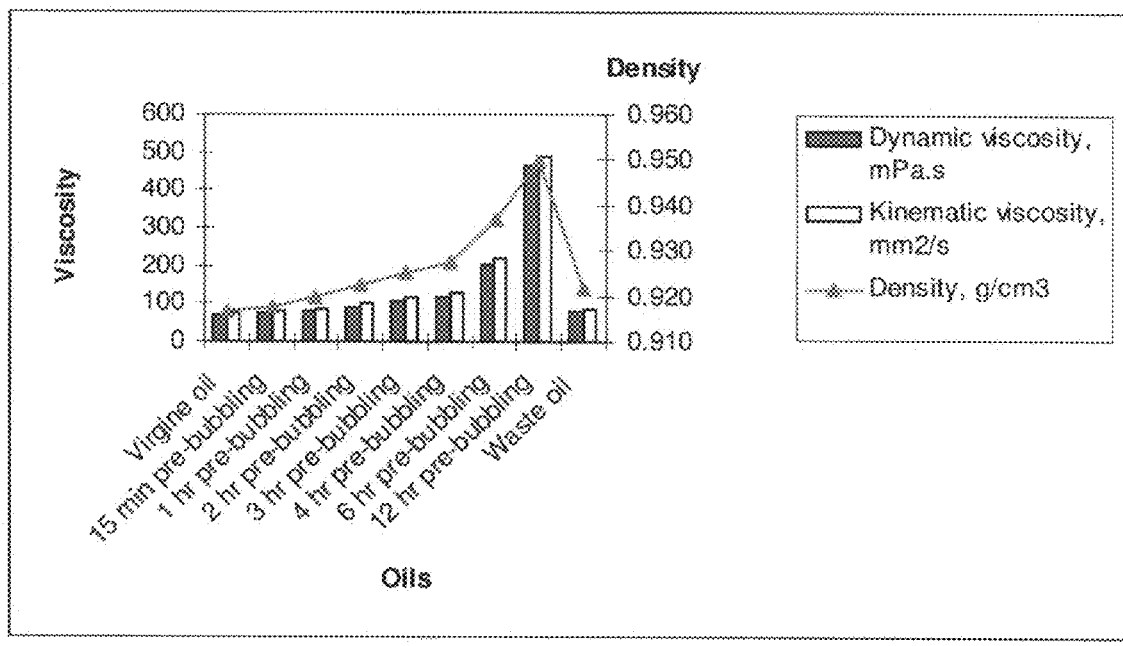
FIG. 15 illustrates the viscosity and density properties of various oils tested in Example 4.
Figure 16:
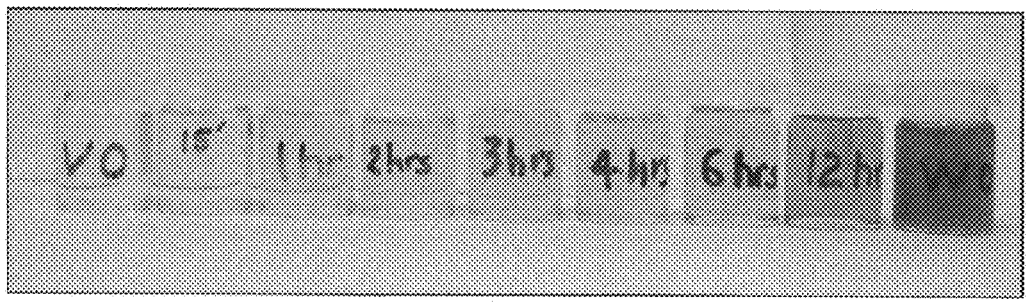
FIG. 16 is a photograph of the samples tested in Example 4.

As can be seen in FIG. 15, the viscosity and density of all samples increased gradually with the duration of heating and pre-oxidation. These results suggest that the heating and pre-oxidation process caused the virgin vegetable oil to be oxidized, polymerised and volatised, which probably account, at least in part, to the change in colour of the oil samples shown in FIG. 16.

The results presented in FIG. 15 also show that the viscosity and density of the selected waste oil are quite close to those properties obtained with 1 hour pre-oxidation of the virgin oil sample.

Compressive strength of vegetable oil based construction materials

Phase 1: Experiments Using Clean Oils

All of the virgin and pre-oxidized oils were used as a binder in vegetable oil/aggregate mixes. The aggregate used for this investigation was a waste limestone aggregate having a nominal maximum aggregate size of 10 mm and was a by-product from a crusher plant.

Figure 17:
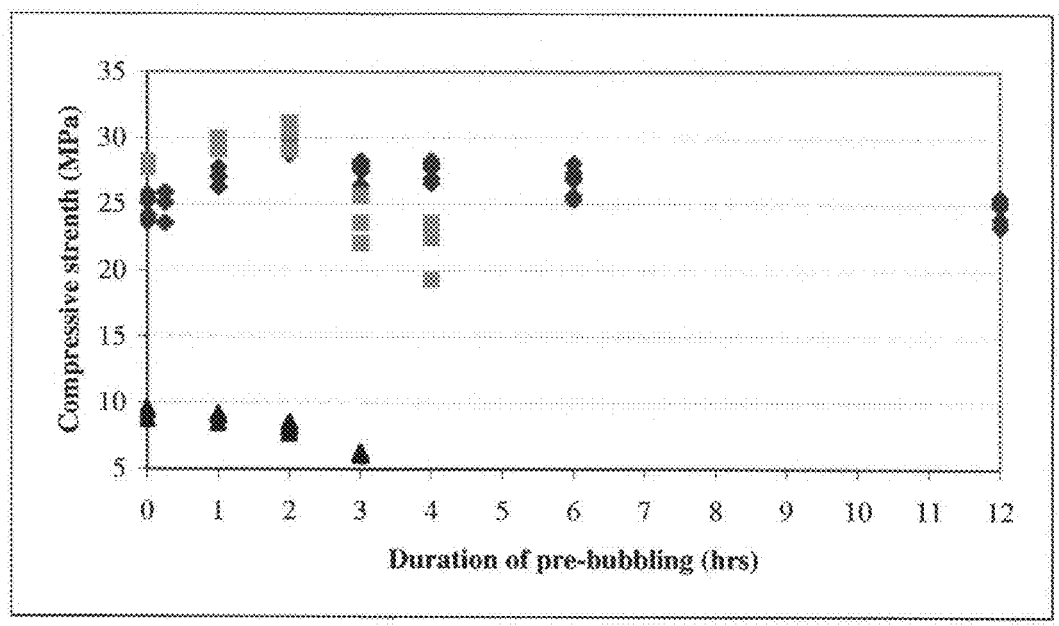
FIG. 17 is a graph showing the measured compressive strength of vegetable oil based construction material samples incorporating different pre-oxidized clean oils, prepared in Example 4.

The vegetable oil content was fixed at 5% by total mass of mix. Oil and aggregate were mixed for 5 minutes by using a conventional asphalt mixer to ensure that the mix was even. An amount of the mix (1100 g) was moulded and compacted at 4 MPa. After de-moulding each sample had a height of approximately 53 mm, density varied from 2.05 to 2.10 g/cm$^3$ and porosity from 12.5 to 15%. Shaped samples were then cured in a convection oven at 160° C. for 12; 24 and 48 hours. Finally, samples were left at room temperature for at least 2 days after which they were tested to determine their compressive strength. The experimental results obtained are presented in FIGS. 17 and 18.

Figure 18:
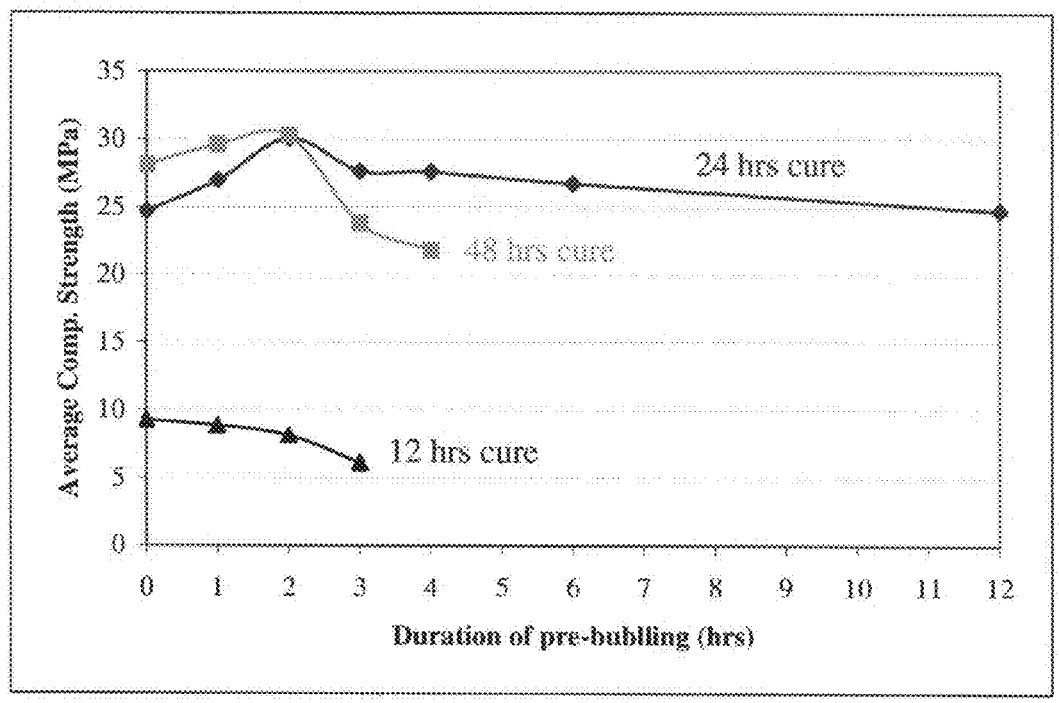
FIG. 18 is a graph showing the average compressive strength of the samples made in Example 4.

As can be seen in FIG. 18, samples cured at 160° C. for 24 hours show a liner increase in compressive strength, from approximately 25 MPa to 30 MPa, when oil samples were heated and pre-oxidized from 0 to 2 hours. After peaking at 2 hours pre-oxidation, the compressive strength gradually decreases for samples pre-oxidized for longer periods of time. The samples which were prepared using 12 hour pre-oxidized oil produced similar results to samples produced using the virgin oil.

Samples cured at 160° C. but for 48 hours showed an increase in compressive strength from 28 MPa for virgin oil to 30 MPa for the sample using 2 hour pre-heated and oxidized oil. The compressive strength then significantly decreases, to 24 MPa and 22 MPa, when the oil was pre-heated and oxidized for 3 and 4 hours, respectively.

With a short duration of curing regime, at 160° C. for 12 hours, the compressive strength of the samples reflects a gradual reduction, from approximately 9 MPa to about 6 MPa, when the duration of pre-heat and oxidation increases, from 0 to 3 hours.

Experimental results obtained from the three curing regimes above have indicated that the improvement in compressive strength of the samples when using pre-heated and oxidized oils occurred only in the case of curing regimes employing a curing duration beyond 12 hours. In addition, with these curing regimes, (i.e. at 160° C. for 24 and 48 hours), 2 hours of pre-heating and oxidation may represent the optimal duration for virgin oil.

Phase 2: Experiments in the Use of Waste Oil

In order to assess effectiveness of pre-heating and oxidation, the selected waste oil was also pre-heated and oxidized at 160° C.±5° C. for 30 minutes; 1; 2; and 3 hours. The processes were carried out in a similar manner to those described above in respect of the virgin oil.

Five waste oils, including virgin waste oil; 30 minutes; 1; 2; and 3 hours pre-heated and oxidized waste oils, were then used to make samples. The proportions of the mixes and the processes to make the samples were the same as in Phase 1 described above (i.e. 5% oil content, compaction pressure of 4 MPa, curing at 160° C. for 24 hours).

Figure 19:
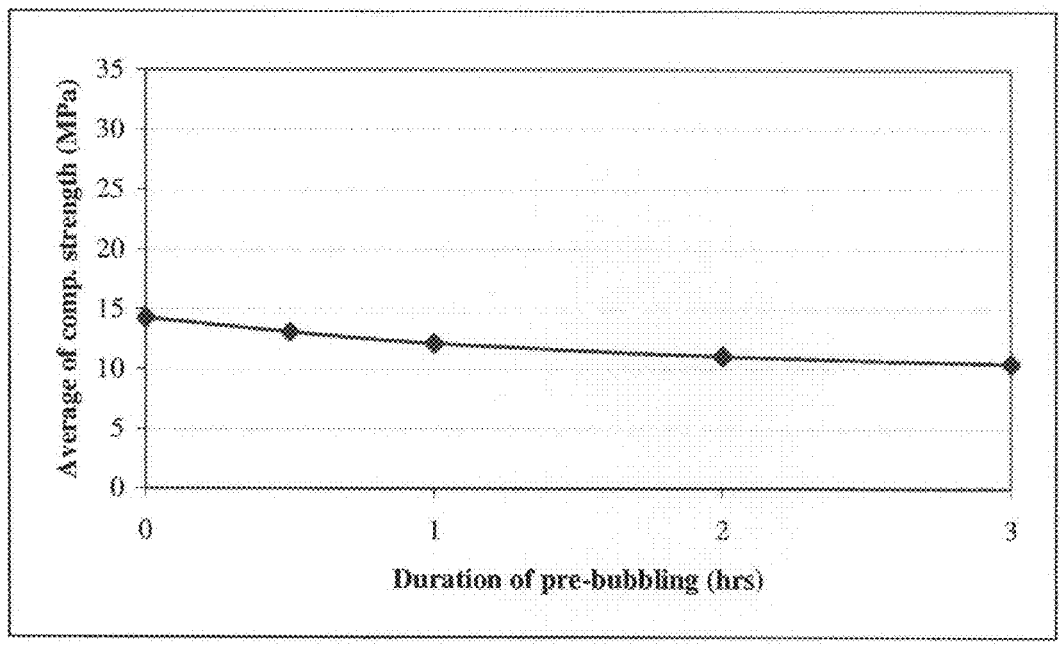
FIG. 19 is a graph of the compressive strength of samples cured at 160° C. for 24 hours using waste oils with different pre-heat and oxidation durations according to Example 4.

The results of the compressive strength tests conducted in respect of these samples are shown in FIG. 19. In contrast to the trend observed in respect of the samples containing clean oil in FIG. 18, pre-heating and oxidation did not seem to improve the compressive strength of the samples within the first 2 hours of the pre-heating and oxidation processes. Compressive strength gradually decreased as duration of pre-heat and oxidation increased, from approximately 15 MPa with virgin waste oil to 10.5 MPa with 3 hours pre-heated and oxidized oils.

Experimental results in phase 1 and phase 2 also indicate that the compressive strength of samples using waste oil is around 50% of that of samples containing clean oil. While the inventors do not wish to be bound by any particular theory, this reduction in compressive strength may be due to particular contaminations, such as food stuffs, present in the specific waste oil used as well as negative physical and chemical changes which may result from previous use of the oil in cooking processes.

Phase 3: Experiments with the Use of 2 Hours Pre-Heated and Oxidized Clean Oil Obtained from Phase 1

In view of the fact that the oil that had been pre-heated/oxidized for 2 hours achieved the highest compressive strength among the seven oil samples used in phase 1, this pre-oxidation regime was selected for further investigation.

In phase 3, trials were carried out using 2-hour-pre-oxidized clean oil but the curing duration at 160° C. was reduced from 24 hours as used previously, to 20 hours and 18 hours. The average compressive strength of six samples prepared using each curing regime was compared with samples prepared using virgin oil.

Figure 20:
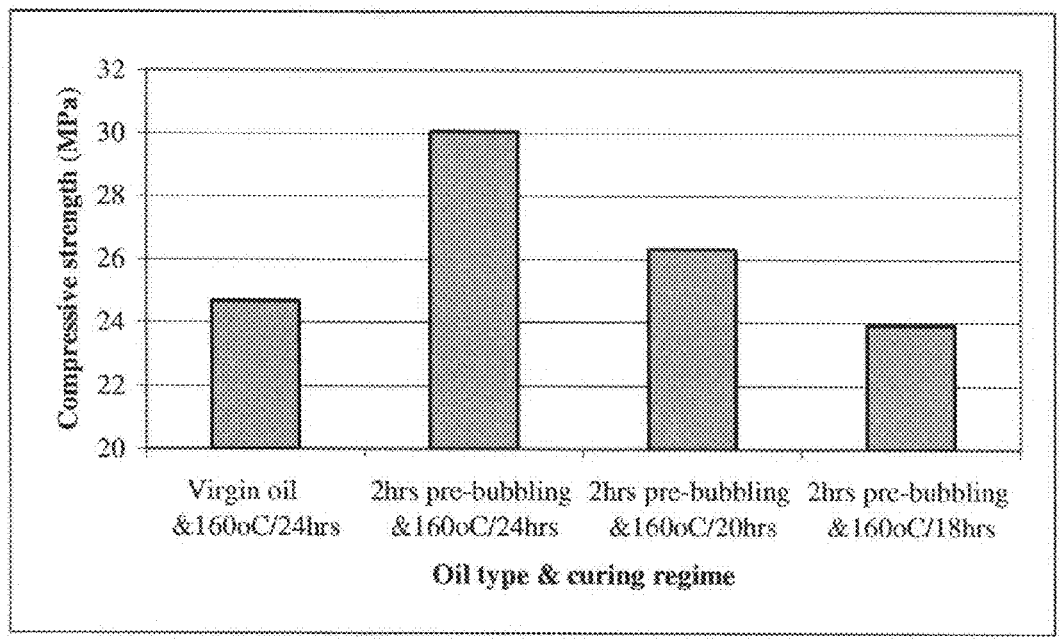
FIG. 20 is a graph of the average compressive strength of a series of construction material samples containing 2-hour-pre-oxidized-oil and virgin oil, as explained below in Example 4.

The average compressive strength obtained from 6 samples for each sample type is shown in FIG. 20.

FIG. 20 indicates a reduction in compressive strength when the curing duration decreases from 24 hours to 18 hours for all samples mixed with 2 hour-pre-oxidized oil. After 20 hours curing the compressive strength of the samples was slightly higher than 26 MPa and for 18 hours curing the compressive strength was just below 24 MPa.

Construction material samples prepared using 2 hour-pre-oxidized oil and cured at 160° C. for 18 hours exhibited a compressive strength that was similar to samples mixed with virgin oil but cured for 24 hours. This result shows that pre-oxidising vegetable oil for 2 hours before mixing with aggregate can provide a 25% reduction in the curing time needed to form a construction material exhibiting good compressive strength.

Conclusions

From Example 4 it can be concluded:

The viscosity and density of vegetable oil increases as the pre-oxidising time is increased;

Beyond 2 hours pre-oxidising, the compressive strength of the samples using clean oil decreases when the samples possessed approximately 15% porosity and had been cured at 160° C.;

When using a 2 hour-pre-oxidized oil as a binder in a construction material mix the duration of curing can be reduced by up to 25% compared to when using virgin oil (both samples possessing around 15% porosity and having been cured at 160° C.).; and The pre-oxidation processes for waste oil does not significantly increase the compressive strength of vegetable oil based construction materials.

Example 5

Construction Elements Reinforced by Steel Fibers
Introduction
Example 4 showed that construction material elements can be produced which exhibit a wide range of compressive strengths. It will be appreciated that the compressive strength of the units prepared in Example 4 satisfy the specification for use in masonry structures as compression units.

To further improve the construction materials according to the present invention, particularly for use in applications requiring the materials to function under tension, the following tests were carried out to determine the behavior of inventive materials incorporating internal reinforcement in the form of steel fibers.

Sample Preparation

100% waste crushed limestone with 100% passing 10 mm was used as aggregate. The steel fibre was supplied from Propex Concrete Systems Corp. under trade name NOVOCON HE1050. The steel fibre had a length of 50 mm and a diameter of 1.0 mm. The fibre dosage used in this investigation was 50 kg/m$^3$ of the mix. Waste vegetable oil was used as the binder.

Figure 21:
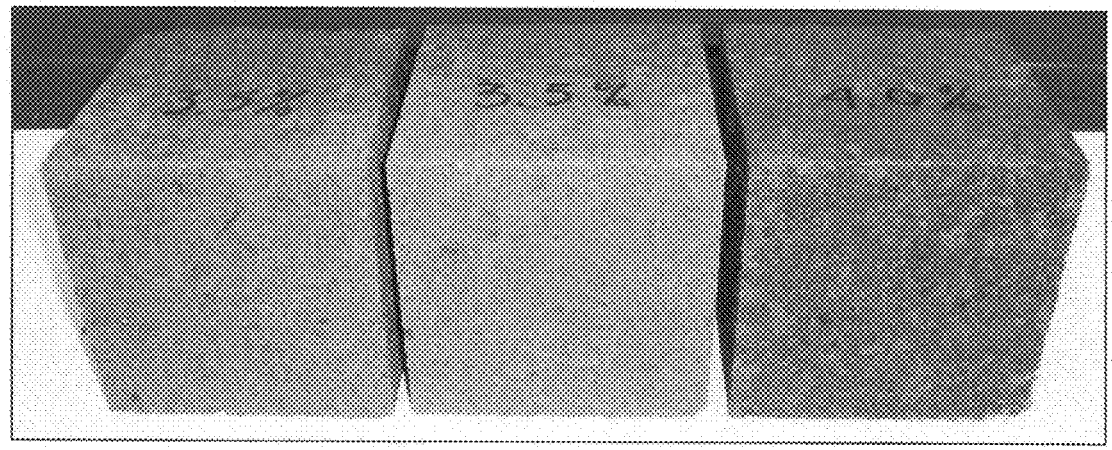
FIG. 21 is a photograph of construction material samples containing different amounts of vegetable oil prepared as described in Example 5.

In earlier studies, the optimal waste oil content used with waste crushed limestone was determined to be 5% when samples were compacted using a static compaction machine. However, when a hammer vibration compactor was used the oil content was reduced to 3.5% as an optimal content. This was because the vibration of the hammer compactor lead to oil leaking out of the mix. Consequently, samples mixed with more than 3.5% of oil were very soft and difficult to handle. FIG. 21 is a photograph which shows that the sample containing 4% oil had more oily surfaces than samples containing different amounts of oil. The process to determine the optimal oil content was initially carried out with samples made using square moulds.

The optimised process was then applied to samples prepared using a beam mould to make structural element samples in the form of beams.

When steel fibers were used the dosage of steel fibre was designed at 50 kg/m$^3$ of the total mix. This dosage was chosen to investigate the effect of the steel fibers on the mechanical properties of the structural elements.

Waste crushed limestone was mixed with vegetable oil for 2 minutes in the usual way to obtain a homogeneous mix. Steel fibers then were added into the mix and the mix then further mixed for a minute to ensure that the steel fibers were distributed evenly in the mix.

Three sets of cube samples (100×100×100 mm) were made to determine their compressive strength (one without steel fibers and 3.5% oil content, one without steel fibers but with 4.0% oil content, and one with steel fibers mixed with 3.5% oil content). The target porosity for each sample was 6% when using a hammer vibration compactor.

Figure 22:
FIG. 22 is a photograph of oblong moulds used to make vegetable oil based structural elements as described in Example 5.

In order to make beam-like structural element samples an oblong mould was coated with a laminated plastic to ensure that the samples were easy to de-mould (see FIG. 22). The amount of each component in the optimal mixes was calculated so that, after vibration compacting, the samples would be formed with a predetermined height and 6% porosity.

All cube and beam samples were cured at 160° C. for 3 days. They were then left at room temperature and atmospheric pressure for over a week before testing.

Figure 23:
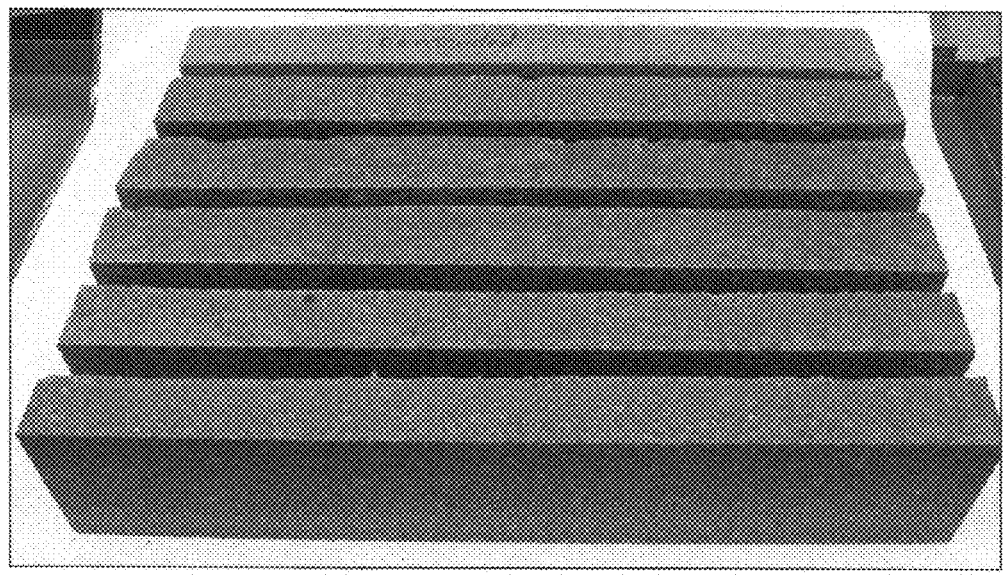
FIG. 23 is a photograph of vegetable oil based structural elements produced using the moulds depicted in FIG. 22 with varying amounts of internal reinforcement as described in Example 5.

Two sets of beam samples were manufactured (one set with steel fibers and one set without steel fibers). Their dimensions were 500×100×40 mm (see FIG. 23).

Test Results

Figure 24:
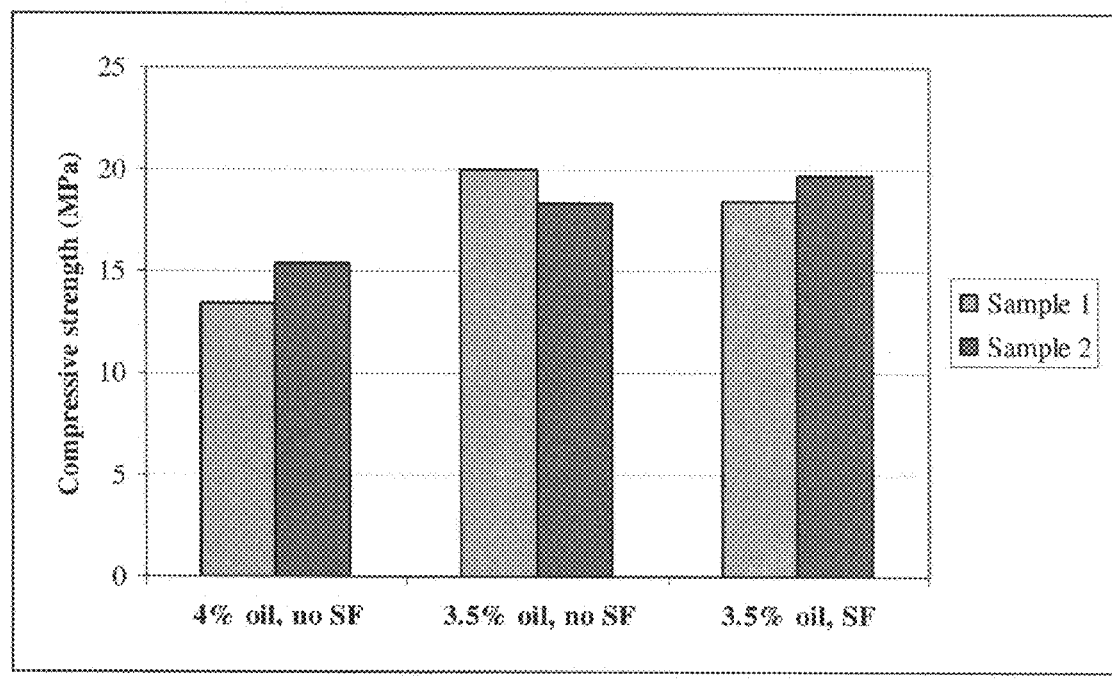
FIG. 24 is a graph showing the compressive strength of cube samples with and without steel fibers (SF) prepared according to Example 5.

As can be seen in FIG. 24, samples containing 4% vegetable oil exhibited lower compressive strength than other samples mixed with 3.5% vegetable oil. There was no significant difference in the compressive strength of the samples containing steel fibre reinforcement compared to the samples which did not contain steel fibers. Both sets of samples containing 3.5% vegetable oil exhibited a compressive strength of approximately 20 MPa. Thus, in this initial study steel fibre reinforcement did not significantly increase the compressive strength of the cubic construction elements. The beam-like structural element samples were tested to determine their strength under tension using a standard bending test. The tests employed the "two point load" method. The load was applied with a rate of 0.1 KN/second. Bending tension strength was calculated by using equation below:

$$\sigma_t = \frac{M}{I}y = \frac{\left(\frac{F}{2} \times \frac{L}{3}\right)}{\frac{b \times h^3}{12}} \times \frac{h}{2} \text{ (MPa)}$$

Where:
F—maximum load when sample failed, N
L—distance between two supports, 300 mm
b—width of cross section of sample, 40 mm
h—height of cross section of sample, 100 mm
The test results obtained are presented in FIG. 25.

Figure 25:
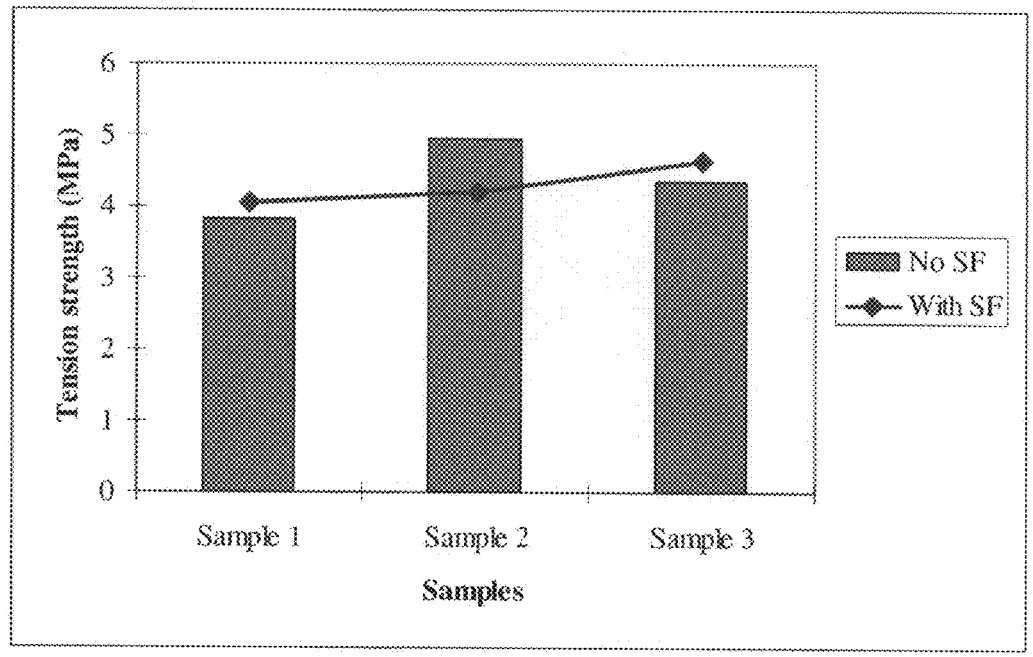
FIG. 25 is a graph showing the bending tension strength of beam samples with and without steel fibers (SF) prepared as described in Example 5.
Figure 26:
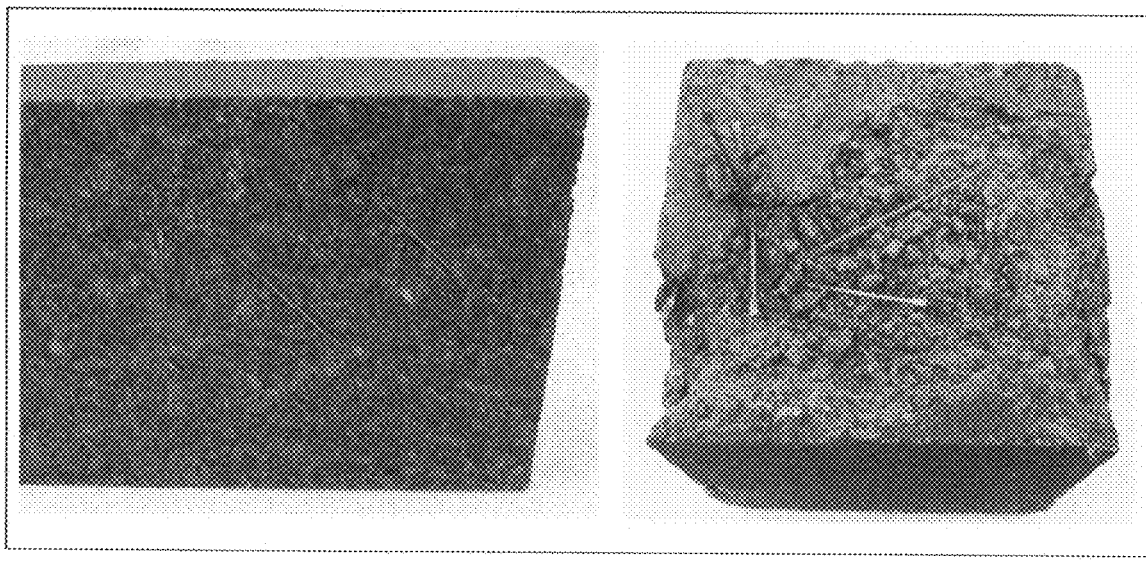
FIG. 26 is a pair of photographs showing the bonding between steel fibers and vegetable oil/aggregate mix in vegetable oil based construction element samples prepared in Example 5.

As can be seen from FIG. 25, the average bending tension strength of samples with and without steel fibers were very similar. They varied between 3.8 MPa to 4.9 MPa. Visible observation of the samples before and after testing showed that bonding between the steel fibers and the mix was not significant (see FIG. 26), except for Hook-end effects.

Conclusions

The experimental results obtained in Example 5 showed that:

In some applications the vegetable oil content used to manufacture vegetable oil based construction elements should be lower when using a hammer vibration compactor than when compacting using a static compaction machine;

Initial tests suggest that construction elements (cubes and beams) can be manufactured which incorporate internal fibrous reinforcing elements thus providing a further means to potentially tailor the properties of vegetable oil based construction elements to a particular application; and Although the initial tests presented above in Example 5 suggest that there was no significant increase in compressive strength or bending tension strength of samples incorporating steel fibers, which may be due to a lack of significant bonding between the steel fibers and the remainder of the mix, it is envisaged that further optimisation of the mixing process to provide more homogenous fibre-containing mixtures will result in improved bonding and thereby increased compressive strength and bending tension strength.

REFERENCES

1. Wastecare, Richmond House, Richmond Works, Garforth, Leeds, LS25 1NB.
2. British Standards Institution, 'Testing concrete. Part 116: Method for determination of compressive strength of concrete cubes', BS1881-116, 1981.
3. British Standards Institution, 'Testing concrete. Part 122: Method for determination of water absorption', BS1881-122, 1981.
4. British Standards Institution, 'Specifications for Clay Bricks', BS3921, 1985.
5. British Standards Institution, 'Use of masonry: Materials and components, design and workmanship', BS5628 Pt. 3, 1985.

The invention claimed is:

1. A method for producing a construction element, comprising mixing partially cured vegetable oil with an aggregate to form a mixture, compacting said mixture in a mould, de-moulding said mixture, and then further curing said vegetable oil within said mixture.

2. A method according to claim 1, wherein said further curing of the partially cured vegetable oil is carried out at a temperature in the range of around 100° C. to around 200° C.

3. A method according to claim 1, wherein said further curing of the partially cured vegetable oil is carried out over a time period of up to around 48 hours.

4. A method according to claim 1, wherein, during the compacting step, the mixture is subjected to a compaction level in the range of around 1 to around 12 Mpa.

5. A method according to claim 1, wherein the vegetable oil content of the mixture is about 1 to about 20 wt %.

6. A method according to claim 1, wherein the method further comprises partially curing vegetable oil prior to mixing said partially cured vegetable oil with the aggregate.

7. A method according to claim 6, wherein said partial curing of the vegetable oil is carried out at a temperature in the range of around 100° C. to around 200° C.

8. A method according to claim 6, wherein said partial curing of the vegetable oil is carried out over a time period of up to around 48 hours.

9. A method according to claim 6, wherein said partial curing of the vegetable oil comprises bubbling air though the oil.

10. A construction element produced according to a method set out in claim 1.

11. A construction element according to claim 10, wherein said construction element is a structural element.

12. A construction element according to claim 10, wherein said construction element comprises internal or external reinforcement.

13. A method for producing a reinforced construction element comprising mixing vegetable oil with a graded aggregate to form a first mixture, mixing a fibrous reinforcing agent with said first mixture to form a second mixture, compacting said second mixture in a mould, de-moulding said second mixture, and then curing said vegetable oil within said second mixture.

14. A method according to claim 13, wherein the second mixture contains up to around 100 kg/m$^3$ of the fibrous reinforcing agent.

15. A method according to claim 13, wherein said curing of the vegetable oil is carried out at a temperature in the range of around 100° C. to around 200° C.

16. A method according to claim 13, wherein said curing of the vegetable oil is carried out over a time period of up to around 48 hours.

17. A method according to claim 13, wherein, during the compacting step, said second mixture is subjected to a compaction level in the range of around 1 to around 12 Mpa.

18. A method according to claim 13, wherein the vegetable oil content of the first mixture is about 1 to about 20 wt %.

19. A method according to claim 13, wherein the method further comprises partially curing said vegetable oil prior to mixing said vegetable oil with the graded aggregate.

20. A method according to claim 19, wherein said partial curing of the vegetable oil is carried out at a temperature in the range of around 100° C. to around 200° C.

21. A method according to claim 19, wherein said partial curing of the vegetable oil is carried out over a time period of up to around 48 hours.

* * * * *